(12) United States Patent
Shimizu et al.

(10) Patent No.: US 8,219,997 B2
(45) Date of Patent: Jul. 10, 2012

(54) EXECUTION THE JOB THAT IS DIVIDED INTO JOB TASKS BASED ON THE ESTIMATED COMPLETION TIME

(75) Inventors: Shuichi Shimizu, Yokohama (JP); Toshiyuki Yamane, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1261 days.

(21) Appl. No.: 11/933,725

(22) Filed: Nov. 1, 2007

(65) Prior Publication Data

US 2008/0115143 A1    May 15, 2008

(30) Foreign Application Priority Data

Nov. 10, 2006   (JP) .................................. 2006-305614

(51) Int. Cl.
   *G06F 9/46* (2006.01)
(52) U.S. Cl. ........................................ 718/104; 718/106
(58) Field of Classification Search .......................... None
   See application file for complete search history.

(56) References Cited

U.S. PATENT DOCUMENTS

| | | | | |
|---|---|---|---|---|
| 7,171,531 | B2 * | 1/2007 | Patterson et al. | 711/163 |
| 2002/0169680 | A1 * | 11/2002 | Becker et al. | 705/26 |
| 2006/0155735 | A1 * | 7/2006 | Traut et al. | 707/101 |

FOREIGN PATENT DOCUMENTS

| | | |
|---|---|---|
| JP | 06028323 | 2/1994 |
| JP | 09160884 | 6/1997 |
| JP | 09282288 | 10/1997 |
| JP | 2003099412 | 4/2003 |
| JP | 2005031771 | 2/2005 |
| JP | 2006134203 | 5/2006 |
| JP | 2006338264 | 12/2006 |
| JP | 2008015958 | 1/2008 |

(Continued)

OTHER PUBLICATIONS

"Information Materials for IDS", date Dec. 15, 2008, prepared by Kohtaroh Tanaka, date of JPO Office Action Dec. 2, 2008.

(Continued)

*Primary Examiner* — Camquy Truong
(74) *Attorney, Agent, or Firm* — William A. Kinnaman, Jr.

(57) ABSTRACT

To implement job execution in which resource assignment and change of the assignment can be dynamically and autonomously performed so as to meet requirements of a job in a job and resource environment in which the operational status cannot be forecasted in advance. A job that can be divided into a selected number of tasks is provided to one computer of a plurality of computers connected via networks, and job tasks are processed with the one computer for predetermined time. A progress rate of task processing for the predetermined time is calculated, and completion time for task processing on the one computer is estimated on the basis of the progress rate and the predetermined time. It is determined whether the estimated completion time meets requirements of the job. When the estimated completion time meets the requirements, job tasks are processed with the one computer, and results are generated. When the estimated completion time does not meet the requirements, job tasks are divided into tasks to be left on the one computer and tasks to be transferred to another computer. The left job tasks are processed with the one computer for further predetermined time, and simultaneously, the tasks to be transferred are transferred to the other computer and the other computer is caused to process the transferred tasks.

19 Claims, 15 Drawing Sheets

FOREIGN PATENT DOCUMENTS

JP WO 2006100752 A1 9/2008

OTHER PUBLICATIONS

Sato et al., "Dynamic Resource Management for Real-time Systems", Proceedings of the 2006 IEICE General Conference, The Institute of Electronics, Information and Communication Engineers, Mar. 8, 2006, p. 13.

Murayama et al., "Design of dynamic resource management middleware for distributed real-time systems", IPSJ SIG Technical Reports, Information Processing Society of Japan, vol. 2006, No. 26, pp. 257-262.

Murayama et al., "Design of dynamic resource management middleware for distributed real-time systems", IPSJ SIG Technical Reports, Information Processing Society of Japan, vol. 2006, No. 26, pp. 257-262, Abstract.

Ruth et al., "Autonomic Live Adaptation of Virtual Computational Environments in a Multi-Domain Infrastructure", Autonomic Computing, 2006. ICAC '06. IEEE International Conference on Jun. 13-16, 2006, ISBN: 1-4244-0175-5.

Urgaonkar et al., "Resource Overbooking and Application Profiling in Shared Hosting Platforms", Proceedings of the Fifth Symposium on Operating Systems Design and Implementation (OSDI '02), Dec. 9-11, 2002, Boston, MA, USA, (IRB-TR-02-015).

* cited by examiner

FIG. 3
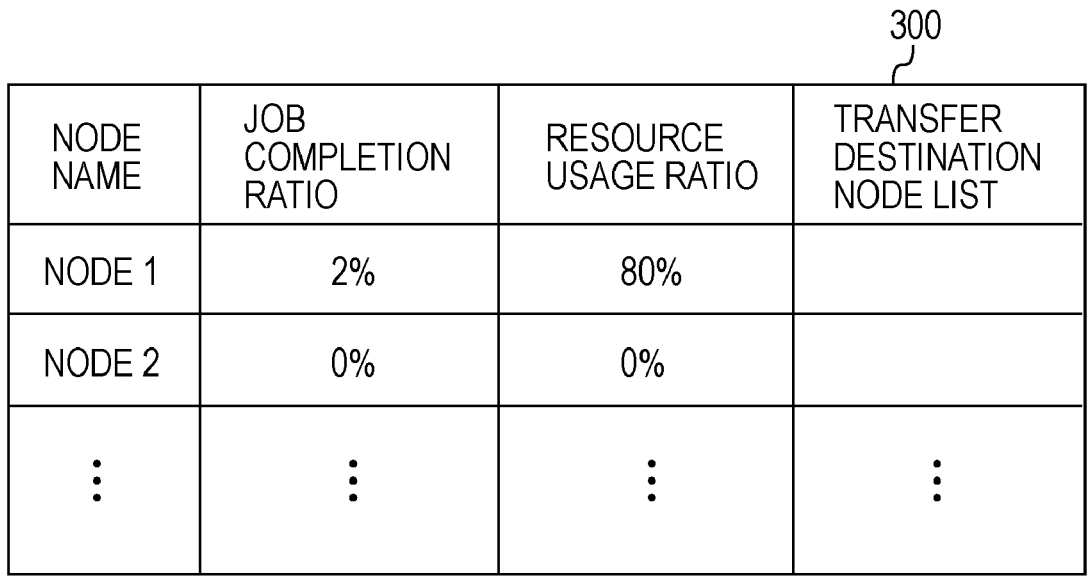
(A)
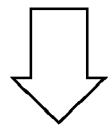
AFTER DIVISION AND TRANSFER OF JOB
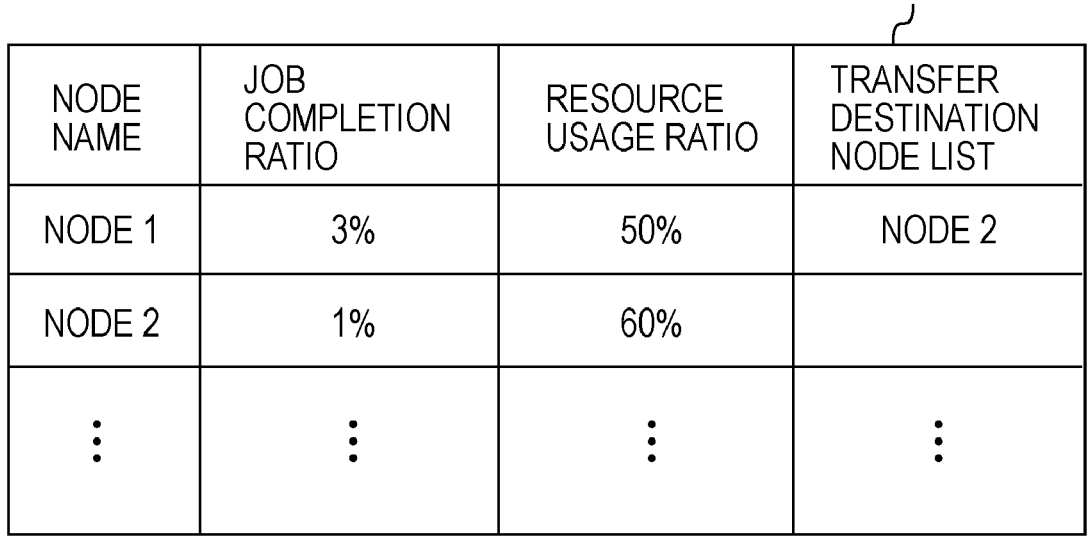
(B)

FIG. 5
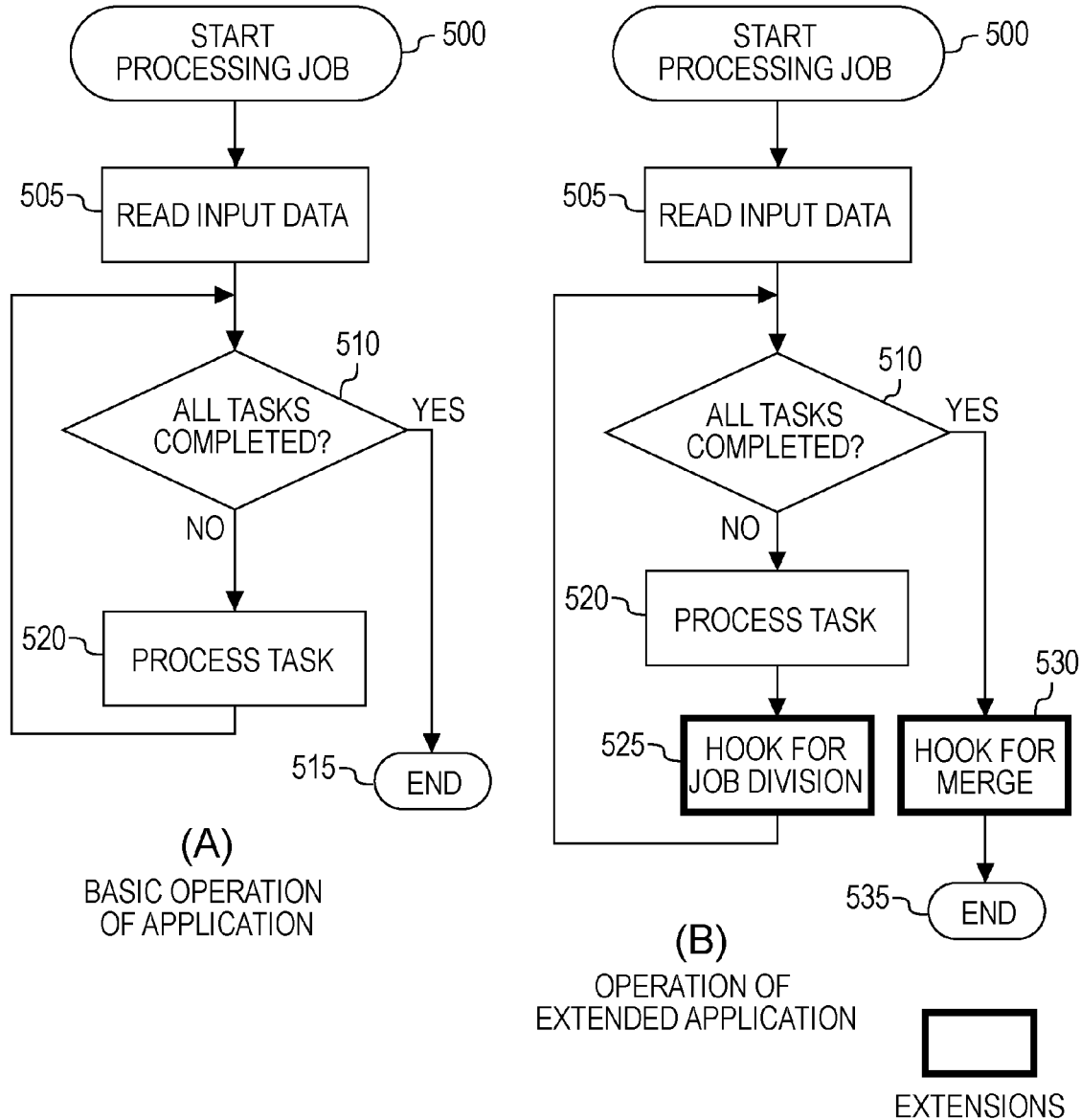
(A) BASIC OPERATION OF APPLICATION
(B) OPERATION OF EXTENDED APPLICATION
EXTENSIONS
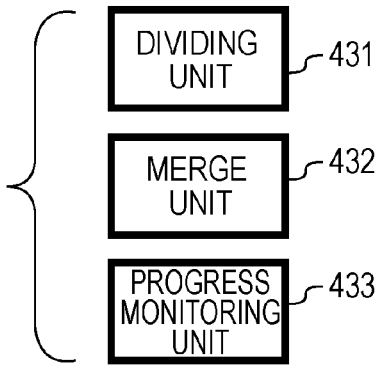
INDEPENDENT CALL-BACK TYPE EXTENSIONS CALLED BY EACH HOOK FIG. 15
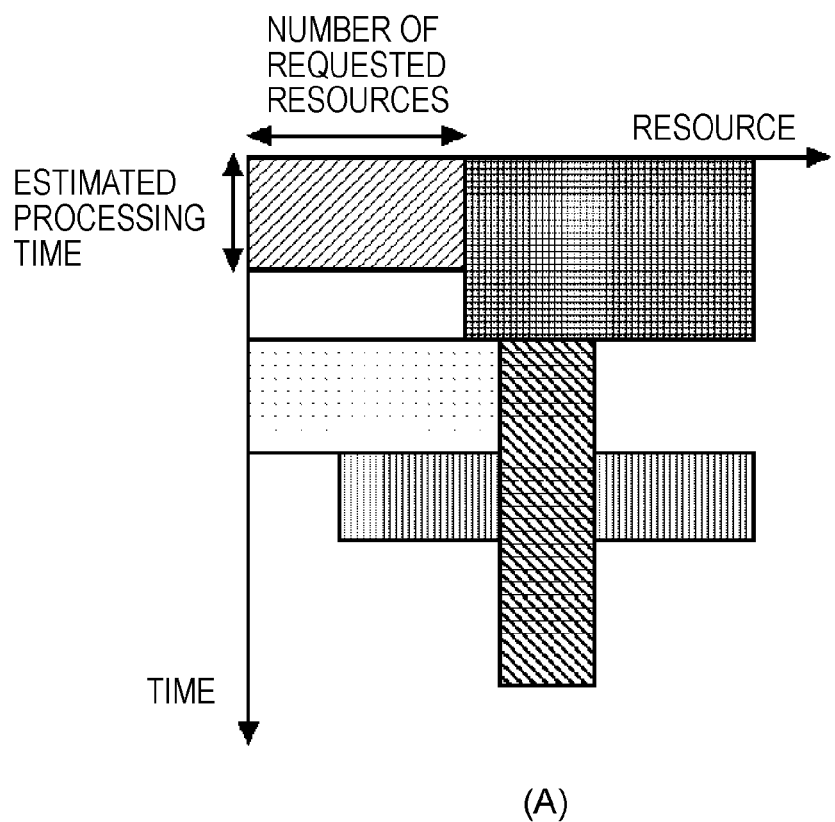
(A)
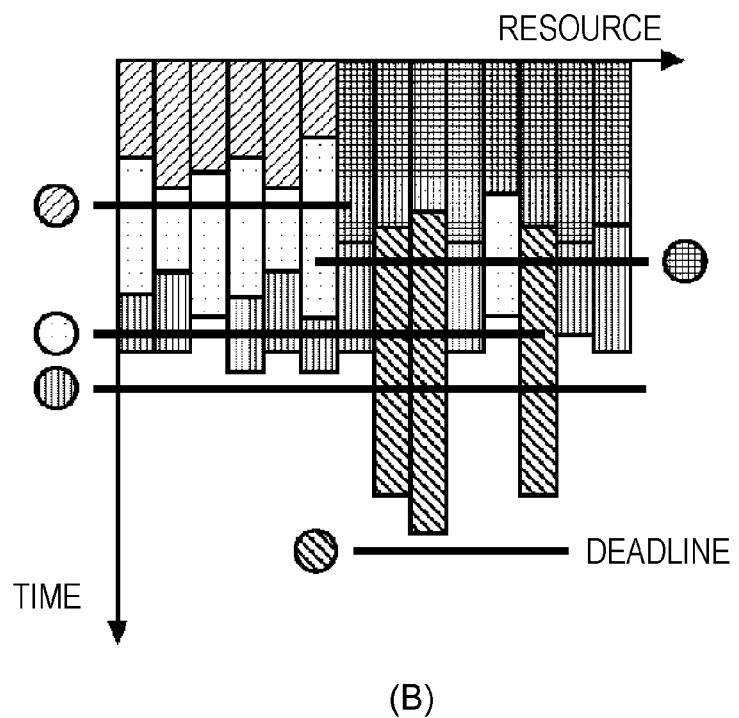
(B)

EXECUTION THE JOB THAT IS DIVIDED INTO JOB TASKS BASED ON THE ESTIMATED COMPLETION TIME

CROSS-REFERENCE TO RELATED APPLICATION

This application claims the priority benefit under 35 U.S.C. §119 of Japanese application 2006-305614, filed Nov. 10, 2006, and incorporated herein by reference.

BACKGROUND OF THE INVENTION

1. Technical Field

The present invention relates to techniques for distributed processing of tasks of a job, and in detail, relates to a method for autonomously dividing and processing tasks when a job is executed, a system for implementing the method, and a computer program for implementing the method via a computer.

2. Background Art

In distributed processing such as grid computing, the allocation of jobs (tasks) to computer resources is an important determinant of performance (for example, completion time) of the jobs, the capability utilization of the resources, and the like. A method is disclosed in B. Urgaonkar, P. Shenoy and T. Roscoe, "Resource Overbooking and Application Profiling in Shared Hosting Platforms", in *Proceedings of the Fifth Symposium on Operating Systems Design and Implementation (OSDI)*, December 2002, in which the operating characteristics of individual jobs are observed in advance, profiles represented by some parameters (an average CPU usage, a burst rate of CPU usage, and the like) are created, and the profiles are used for allocation planning. The plan is carried out by controlling the QoS (Quality of Service) of resources using a special driver and the like during job execution. However, critical problems with this method are still open, for example, a first-time job with which no profile exists cannot be handled, it is difficult to accurately forecast the status in which a plurality of jobs share resources even when only a small number of parameters of a profile are used, and a special process is necessary to control the QoS of resources.

On the other hand, a method for dynamically relocating a running job to another resource environment is disclosed in Paul Ruth, Junghwan Rhee, Dongyan Xu, Rick Kennell, and Sebastien Goasguen, "Autonomic Live Adaptation of Virtual Computational Environments in a Multi-Domain Infrastructure", *International Conference on Autonomic Computing (ICAC)* 2006. Since, without modifying a job in the application layer at all, the whole job, which is divided into tasks, is transferred to another resource environment, this method can be applied to an application in which an execution schedule is dynamically changed in response to the status of a running job. However, since a whole job is transferred as a unit without changing the structure of tasks, it is assumed that a resource environment that is highly suitable as a transfer destination is available. Thus, in the case of a resource environment that operates at a high usage ratio, transfer destination assignment may be difficult. Moreover, the quality of job execution after the transfer is not guaranteed.

Moreover, a dynamic load distribution parallel computer system is disclosed in Japanese Unexamined Patent Application Publication No. 9-160884, in which a table that periodically stores the task loads of individual nodes is provided in a commonly accessible shared memory of the individual nodes, and when it is determined that tasks generated in one node cannot be processed within the time limit, the one node locates another node, the task load of which is lower than that of the one node, referring to the shared memory, and requests the other node to process the tasks, which the one node cannot process, instead of the one node. When the number of tasks to be processed increases in each of the nodes, the increased number of tasks can be dynamically handled. However, it is necessary to always check the task loads of all the nodes and store data of the task loads in the shared memory of the individual nodes, and it is not guaranteed that, when one node refers to the shared memory, the one node always locates another node, the task load of which is lower than that of the one node, so that it may be the case that the one node cannot request another node to process tasks instead of the one node.

Moreover, a job scheduling management method is disclosed in Japanese Unexamined Patent Application Publication No. 2005-31771, the operational status of computers to which jobs are assigned is monitored by a management server, and when the operational status does not satisfy prescribed conditions, for example, job completion time, uncompleted jobs are detected, and, on the basis of information of resources necessary to execute the uncompleted jobs, another computer that can execute the uncompleted jobs is extracted to assign the uncompleted jobs to the other computer. Although job scheduling can be performed in a manner that depends on the operational status of resources, information on a plurality of computers that execute jobs, such as the content of job execution, resources necessary for job execution, and available resources, must be always centrally managed by the management server, and job scheduling must be performed only by the management server.

SUMMARY OF THE INVENTION

The present invention can solve the aforementioned problems with the known arts. In particular, it is an object of the present invention to, in a job and resource environment in which the operational status cannot be forecasted in advance, implement job execution in which resource assignment and change of the assignment can be dynamically and autonomously performed so as to meet requirements of a job, such as a service level agreement (SLA) and a service level objective (SLO). The object of the present invention includes providing a method for processing a job while autonomously dividing the job into tasks when the job is executed, the method implementing such job execution, a system for implementing the method, and a computer program for implementing the method via a computer. In the present invention, in a solution for the aforementioned problems with the known arts, versatility is considered. For example, operations in an available resource environment (Globus Toolkit 4 and the like) are assumed. Moreover, consideration is given so that resource assignment can be flexibly and appropriately performed not only in a resource environment in which resources have the same performance but also in a resource environment in which different types of device are mixed and in a resource environment in which the performance of resources varies.

In a method according to the present invention for executing a job that can be divided into a selected number of tasks with a plurality of computers connected via networks, at least the following steps are performed: The job is first provided to one computer of the plurality of computers, and job tasks are processed with the one computer for predetermined time. Then, with a processing unit on the one computer, a progress rate of task processing for the predetermined time is calculated, and completion time for task processing on the one computer is estimated on the basis of the progress rate and the predetermined time. Then, it is determined with the processing unit whether the estimated completion time meets requirements of the job. When the estimated completion time meets the requirements in this determination, job tasks on the one computer are processed with the one computer, and results are generated. However, when the estimated completion time does not meet the requirements in this determination, with the processing unit, job tasks on the one computer are divided into tasks to be left on the one computer and tasks to be transferred to another computer of the plurality of computers. Then, with the one computer, the left job tasks are processed for further predetermined time, and simultaneously, with the processing unit, the tasks to be transferred are transferred to the other computer and the other computer is caused to process the transferred tasks. In particular, when the estimated completion time does not meet the requirements, until the estimated completion time meets the requirements, a cycle is repeated, in which completion time for task processing is estimated, and job tasks are divided, so that left job tasks are processed for further predetermined time and simultaneously tasks to be transferred are transferred to the other computer and the other computer is caused to process the transferred tasks. Then, with the processing unit, results of the transferred and processed tasks are obtained from the other computer, and the obtained results are merged with results of the tasks processed with the one computer.

In the aforementioned method according to the present invention, transferring the tasks to be transferred to the other computer and causing the other computer to process the transferred tasks preferably include processing tasks transferred to the other computer in the same manner that job tasks are processed on the one computer. Moreover, obtaining results of the transferred and processed tasks from the other computer preferably includes returning, from the other computer to the one computer, results obtained by, in the same manner, processing tasks in the other computer and merging results of the tasks.

A system according to the present invention that executes a job that can be divided into a selected number of tasks includes a plurality of computers connected via networks, and a center console connected to the plurality of computers via networks. The system includes at least the following components. That is to say, each of the computers includes an extended application unit that is executed by a processing unit in each of the computers, the extended application unit including an extension unit that divides job tasks and merges results of the tasks, an execution adaptor unit that is executed by the processing unit, the execution adaptor unit activating the extended application unit and causing the extended application unit to divide job tasks and merge results of the tasks, and an execution management unit that is executed by the processing unit, the execution management unit activating the execution adaptor unit and managing the extended application unit and the execution adaptor unit. The center console includes an execution information management unit that is executed by a processing unit in the center console, the execution information management unit obtaining data of execution status of the job in each of the computers from the execution adaptor unit, and when job tasks are divided in each of the computers, selecting another computer out of the plurality of computers as a transfer destination to which the divided tasks are transferred and indicating the other computer to the execution adaptor unit.

In the aforementioned system according to the present invention, the extension unit in the extended application unit preferable includes a progress monitoring unit that monitors the number of job tasks that have been processed by each of the computers and generates data of a progress rate of task processing, a dividing unit that reads tasks that have not been processed in each of the computers from a storage unit in each of the computers, divides the read tasks, generates data of tasks to be transferred, and stores the generated data in the storage unit, a merge unit that merges data of results of processing tasks left by the task division with data of results of processing the tasks transferred by the task division in a transfer destination, and a hook library for the execution adaptor unit to call the progress monitoring unit, the dividing unit, and the merge unit. Moreover, the execution adaptor unit preferably includes a division determining unit that obtains the data of the progress rate of the task processing from the progress monitoring unit to estimate completion time of the task processing, obtains data of requirements of the job from a memory unit in each of the computers, and determines whether the estimated completion time meets the requirements, a task transfer unit that prepares data of the tasks to be transferred by the task division from the storage unit, obtains data on a transfer destination from the memory unit, and provides the data of the tasks and the data on the transfer destination to the execution management unit to transfer the tasks, and a task completion monitoring unit that monitors whether processing of the transferred tasks has been completed in the transfer destination.

In the aforementioned system according to the present invention, it is preferable that the center console accept application software and data of the job from a user, generate extended application software and execution adaptor software from the application software, provide the data of the job, the extended application software, and the execution adaptor software to each of the computers, cause each of the computers to execute the job, receive a result of executing the job from each of the computers, and then provide the result to the user.

A program product according to the present invention for executing a job that can be divided into a selected number of tasks with a plurality of computers connected via networks causes one computer of the plurality of computers to perform at least the following steps: That is to say, job tasks are first processed for predetermined time. Then, with a processing unit on the one computer, a progress rate of task processing for the predetermined time is calculated, and completion time for task processing on the one computer is estimated on the basis of the progress rate and the predetermined time. Then, it is determined with the processing unit whether the estimated completion time meets requirements of the job. When the estimated completion time meets the requirements in this determination, job tasks on the one computer are processed with the one computer, and results are generated. However, when the estimated completion time does not meet the requirements in this determination, with the processing unit, job tasks on the one computer are divided into tasks to be left on the one computer and tasks to be transferred to another computer of the plurality of computers. Then, with the one computer, the left job tasks are processed for further predetermined time, and simultaneously, with the processing unit, the tasks to be transferred are transferred to the other computer and the other computer is caused to process the transferred tasks. In particular, when the estimated completion time does not meet the requirements, until the estimated completion time meets the requirements, a cycle is repeated, in which completion time for task processing is estimated, and job tasks are divided, so that left job tasks are processed for further predetermined time and simultaneously tasks to be transferred are transferred to the other computer and the other computer is caused to process the transferred tasks. Then, with the processing unit, results of the transferred and processed tasks are obtained from the other computer, and the obtained results are merged with results of the tasks processed with the one computer.

According to the present invention, in a job and resource environment in which the operational status cannot be forecasted in advance, job execution can be implemented, in which resource assignment and change of the assignment can be dynamically and autonomously performed so as to meet requirements of a job. Such resource assignment is scalable and versatile, flexibly and appropriately handles various types of resource environment, and is robust against a dynamic change in the status of a resource environment.

BRIEF DESCRIPTION OF THE DRAWINGS

FIG. 3 shows an example of the data structure of a node management table in a storage unit in a center console.

FIG. 5 briefly shows a method according to an embodiment of the present invention for extending an application.

FIG. 15 is a graph showing the manner of operations of five different jobs.

BEST MODE FOR CARRYING OUT THE INVENTION

Figure 1:
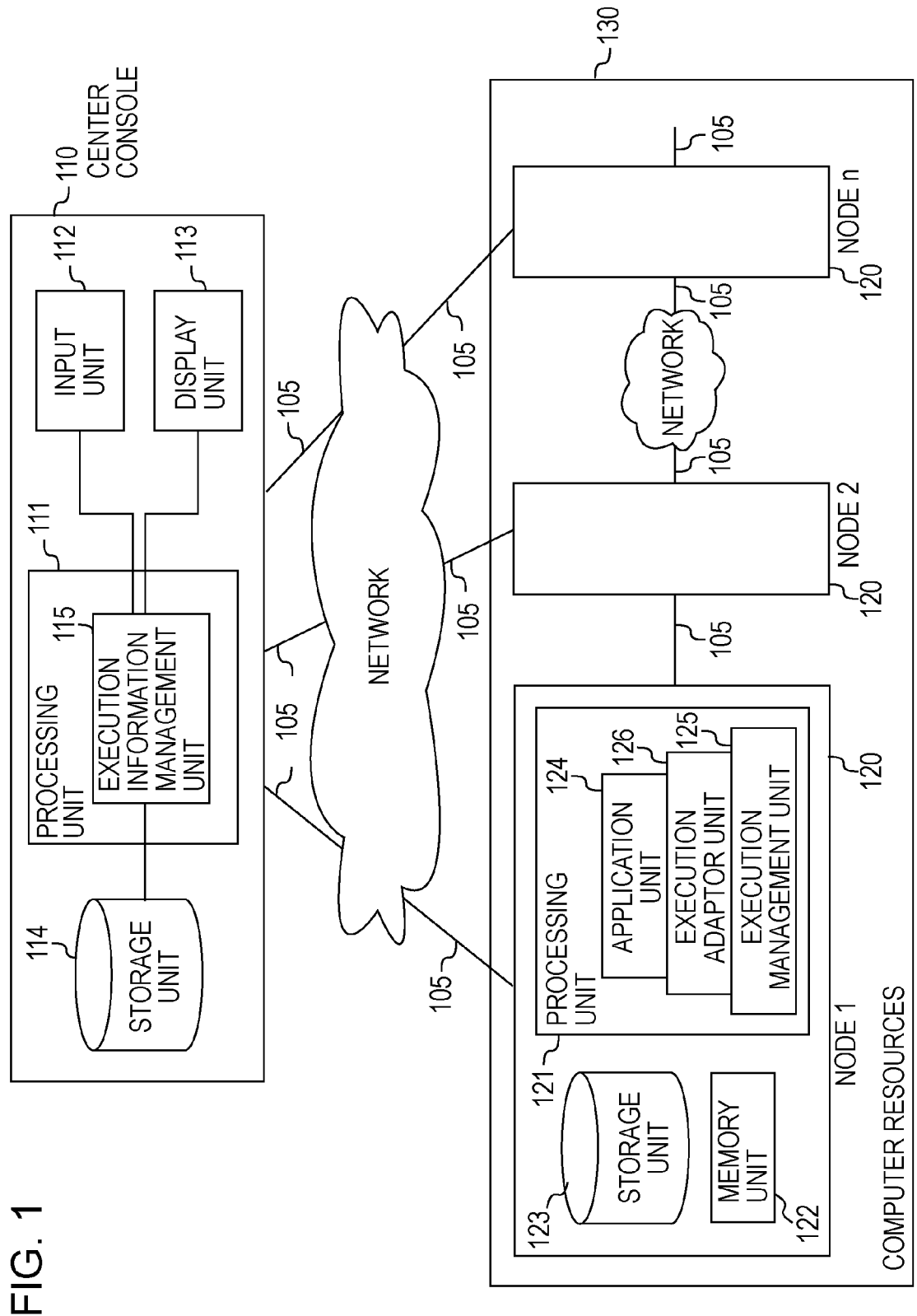
FIG. 1 shows an outline structure of a job execution system according to an embodiment of the present invention.

In embodiments of the present invention, a job that can be divided into a selected number of tasks is executed on a plurality of nodes. Scalable distributed job execution can be implemented by appropriately dividing tasks on each of the nodes, transferring some of the tasks to another node, and executing some of the tasks on the other node, as necessary, in response to the operational status of the tasks on each of the nodes, scalable distributed job execution involving appropriate task division. Such dividable jobs include a parameter sweep application, a Monte Carlo simulation, a divide and conquer application, and the like, in which many parameters are tested. In distributed job execution involving task division in response to the operational status of tasks, steps of the data processing include the following operations:

1. A whole job is sent to a node, and execution of the job as a single task is started.
2. In processing of the task in the node, when it is determined that requirements (SLA/SLO), such as desired execution completion time (a deadline) and a resource usage cost (a charge), are likely to be breached finally, the running task is suspended.
3. The task is divided by a process, for example, dividing the range of job data.
4. Tasks to be processed are left, and the other divided tasks are transferred to another node.
5. The tasks to be processed and the divided tasks are resumed and started, respectively.
6. Steps 2 to 5 are repeated in each of the nodes.

In each of the nodes, the details of the job execution status are not predicted, and the probability that requirements are breached is determined using, for example, a simple counter. For example, estimated completion time is periodically estimated from a counter indicating the progress, the total number of tasks, and the elapsed time, and is compared with a prescribed deadline to determine the probability that requirements are breached. This determination is performed independently in each of the nodes. Thus, even in an environment in which different types of device are mixed, the determination can be done very robustly, and can flexibly respond to influence such as fluctuations in performance of a local job. The final result of the job is retuned to the first node by hierarchically summarizing the results by, using relationships in a hierarchical tree structure of the nodes that is dynamically constructed by the division and the transfer, tracing back the tree structure in a direction from leaves to a root of the tree structure.

In an embodiment of the present invention, an execution information management unit implemented via a processing unit in a computer system functioning as a center console is located in an upper position in a group of all nodes of resources, and supports overall job execution by, for example, functioning as an interface for inquiries from users, monitoring the progress of a whole job, the usage of resources, and the like, and presenting potential nodes to which divided tasks can be transferred. The computer system functioning as a center console retains, in a storage unit, job description files for defining jobs and a table in which the progress of jobs in nodes is recorded. Job definition is definition in which, basically, the characteristics of a job to be input to a grid system are described and includes the following items of information: (1) SLO about a job, for example, desired execution completion time (a deadline); (2) an input file in which parameters unique to an application and the like are described; and (3) the ID of a node (corresponding to a root part of a tree structure) to which a job is first input.

Moreover, a job execution status management table of nodes includes the following items: (1) a node ID; (2) a job completion ratio; (3) a resource usage ratio; and (4) a list of nodes to which some of tasks to be processed are transferred.

Moreover, after an execution adaptor unit implemented via a processing unit in a computer system functioning as a job execution node is activated by grid middleware, the execution adaptor unit monitors the progress of tasks with an extended application unit that includes an extension unit in which an application of a job (a task) is extended. The execution adaptor unit further monitors the resource usage ratio of the node and periodically reports the resource usage ratio to the execution information management unit. When the execution information management unit receives an inquiry about a transfer destination node from a node that divides and transfers a job, the execution information management unit returns an appropriate transfer destination node on the basis of the report. When the execution adaptor unit divides and transfers tasks in response to the progress of the tasks, the execution adaptor unit causes the extension unit to suspend processing of the tasks, divide the tasks, transfer divided tasks to another node, and then resume remaining tasks. The execution adaptor unit further causes the extension unit to merge the result of processing the remaining tasks and the results of processing the transferred tasks.

The best modes for carrying out the invention will now be described in detail on the basis of the drawings. The following embodiments do not restrict the invention claimed in the claims. Moreover, all combinations of features described in the embodiments are not necessarily mandatory for the problem-solving means of the invention. The same numbers are assigned to the same components throughout the description of the embodiments.

FIG. 1 shows an outline structure of a job execution system 100 according to an embodiment of the present invention that autonomously divides and processes tasks when a job is executed. In the job execution system 100 according to the embodiment of the present invention, a center console 110 is connected to a plurality of nodes 120 via networks 105, as shown in FIG. 1. The center console 110 inputs and outputs information on jobs executed on the nodes 120 and monitors the job execution status of the nodes 120. The nodes 120, which actually execute jobs, constitute computer resources 130. The plurality of nodes 120 constituting the computer resources 130 are connected to each other via the networks 105, like a node 1, a node 2, . . . , a node n.

The center console 110 processes information on jobs that are input and output. The center console 110 includes a computer system that includes, for example, a processing unit 111, such as a CPU, an input unit 112, such as a keyboard and a mouse, a display unit 113, such as a CRT display, that displays information of the job execution status of the job execution system 100, and a storage unit 114, such as an HDD, that stores various types of data. When the present invention is implemented, an execution information management unit 115 that manages information on job execution on the nodes 120 is implemented via the processing unit 111. The execution information management unit 115 is described below. Information on jobs, such as application software that processes jobs, job description files in which jobs are described, and job data to be processed, may be input from the input unit 112 or may be input from an external device, such as a terminal unit, connected to the center console 110 via a network.

Each of the nodes 120 in the computer resources 130 just needs to include functions necessary to execute jobs, like a computer system that includes a processing unit 121, such as a CPU, a memory unit 122, such as a DRAM, and a storage unit 123, such as an HDD. The performances, the types, and the like of the nodes 120 need not be the same. The present invention is applicable to not only a cluster environment and an environment, typified by a grid environment, in which different types of device are mixed. When the present invention is implemented, an application unit 124 for software that processes jobs, an execution management unit 125 for managing job execution, and an execution adaptor unit 126 that divides and transfers tasks when a job is executed are implemented via the processing unit 121.

In each of the nodes 120, software of the application unit 124 is executed under the control of the execution management unit 125. The execution management unit 125 can activate any application software. The execution management unit 125 manages a process from start to end of application software and ensures reliable exchange of input and output data with a calling side. The execution management unit 125 can be implemented using, for example, Globus Toolkit that is an existing product. In the present invention, application software of the application unit 124 is not activated directly by the execution management unit 125, and the application software of the application unit 124 is activated via the execution adaptor unit 126, implemented via software, between the application unit 124 and the execution management unit 125.

Figure 2:
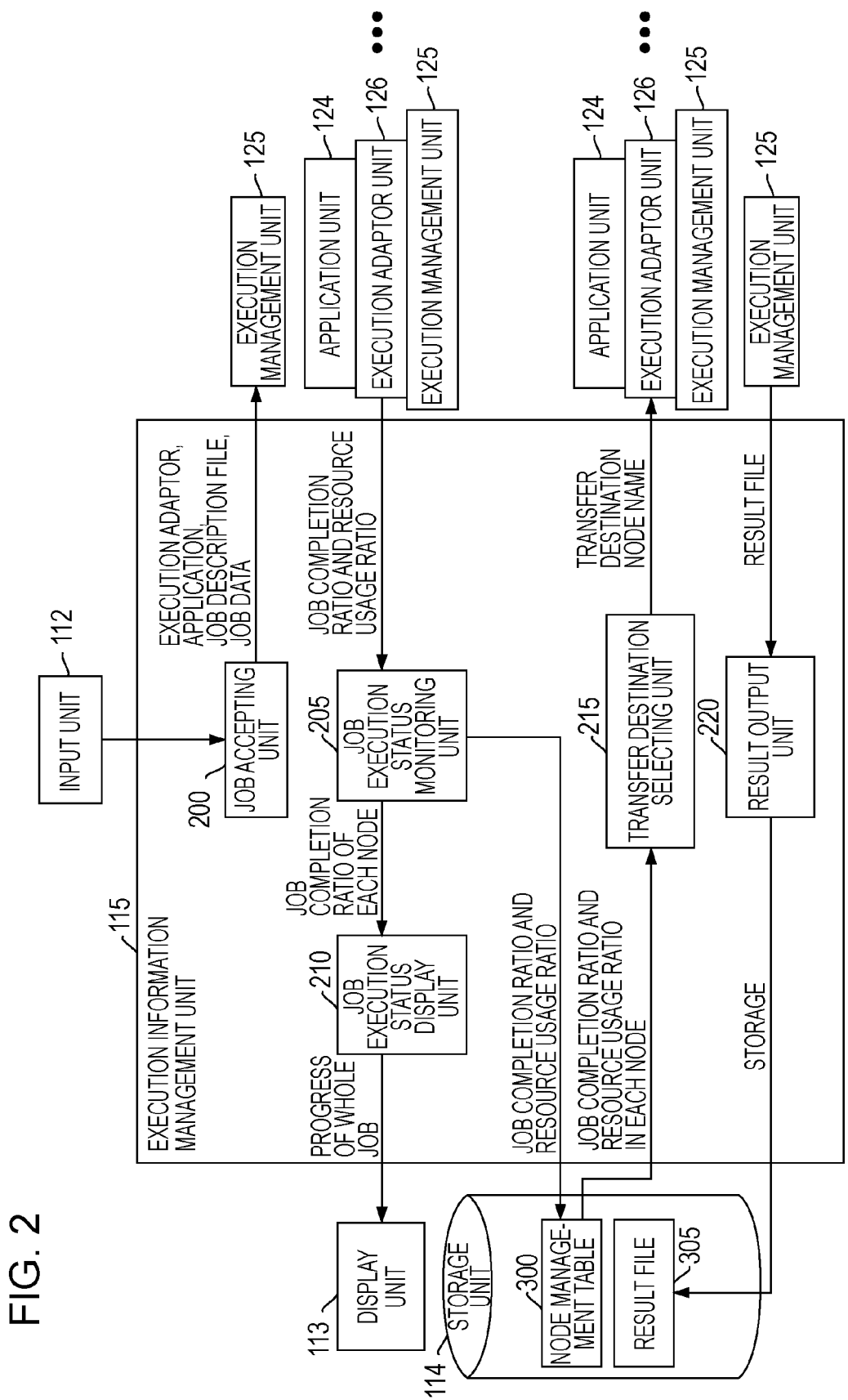
FIG. 2 is a functional block diagram showing the main functions of an execution information management unit according to an embodiment.

FIG. 2 is a functional block diagram showing the main functions of the execution information management unit 115 in the center console 110 according to an embodiment, together with the structure and data flow. A job accepting unit 200 accepts, from, for example, the input unit 112, a file in which a job that is requested to be processed by a user is described (including the description of a deadline), i.e., a job description file, application software that actually processes the job, and job data to be processed. Then, in a case where the center console 110 provides a job execution service in which a job requested by a user is executed according to the present invention, execution adaptor software, extended application software, a job description file, and job data are supplied as a job set from the job accepting unit 200 to the execution management unit 125 in appropriate one of the nodes 120. In this stage, a job set can be supplied to any one of the nodes 120. In this case, the center console 110 may not provide execution adaptor software and extended application software. Alternatively, a user may prepare them and provide a job set to the center console 110, and the center console 110 may provide the job set to the execution management unit 125 in appropriate one of the nodes 120. The execution management unit 125 at the top of the right end, to which the job set has been provided, exists in one of the nodes 120 that first executes processing of the job and first activates execution adaptor software to generate the execution adaptor unit 126. Subsequently, the execution adaptor unit 126 activates the application unit 124 generated with application software.

A job execution status monitoring unit 205 communicates with the execution adaptor unit 126 on the one of the nodes 120 processing the job to obtain items of data of a job completion ratio and a resource usage ratio and provides data of a job completion ratio of each of the nodes to a job execution status display unit 210. The job execution status monitoring unit 205 further provides the items of data of the job completion ratio and the resource usage ratio to the storage unit 114. The items of data are retained in a node management table 300 set in the storage unit 114 and updated as necessary. Although only one execution adaptor unit 126 communicating with the job execution status monitoring unit 205 is shown for brevity, it should be understood that the job execution status monitoring unit 205 communicates with the execution adaptor units 126 in the plurality of nodes 120 to obtain these items of data.

A job execution status display unit 210 provides data of the progress of the overall processing of the job to the display unit 113 on the basis of the received data of the job completion ratio of each of the nodes. In the execution information management unit 115, the data of the progress of the whole job can be calculated from the data of the job completion ratio of each of the nodes from the job execution status monitoring unit 205. Thus, the progress of the whole job is displayed on the display unit 113 in the center console 110 so that notification of the progress of the whole job is provided to an operator or users in the center.

A transfer destination selecting unit 215 obtains data of the resource usage ratio of each of the nodes with reference to the node management table 300 in the storage unit 114 when a job needs to be divided and transferred by the execution adaptor unit 126. Then, for example, the transfer destination selecting unit 215 checks the CPU usage of each of the nodes from the data of the resource usage ratio and selects one of the nodes, the CPU usage of which is the lowest, or selects a transfer destination node on the basis of data of the resource usage ratios of individual nodes, for example, nodes that are not involved in the processing of the job, from which no resource usage ratio data is obtained. Then, the transfer destination selecting unit 215 provides data of the node name of the selected transfer destination node to the execution adaptor unit 126. The number of nodes in which tasks need to be transferred by dividing a job is not necessarily one. Thus, although only one execution adaptor unit 126 communicating with the transfer destination selecting unit 215 is shown for brevity, it should be understood that the transfer destination selecting unit 215 communicates with the execution adaptor units 126 in the plurality of nodes 120 to provide data of transfer destination node names.

A result output unit 220 receives a result file obtained from the processing of the job from the execution management unit 125 on the one of the nodes 120, which was first requested to execute the processing of the job, and stores the result file in a result file 305 in the storage unit 114.

FIG. 3 shows an example of the data structure of the node management table 300 set in the storage unit 114. Since the node management table 300 is a table in which the execution status of processing of a job in each of the nodes is managed, the node management table 300 includes data of the following items. Data of a name with which a node can be uniquely identified, such as a node ID, is stored in a node name field. FIG. 3 shows a node 1 and a node 2 as typical examples. Data indicating the proportion of tasks that have been processed at the present time in each of the nodes is stored in a job completion ratio field. Since tasks are processed one by one in each of the nodes, a job completion ratio can be calculated by counting the number of tasks that have been processed every time a task is processed and comparing the number of tasks with the total number of tasks in a job. After predetermined time has elapsed after starting execution of a job, 2% of tasks have been completed in the node 1, and no task has been processed in the node 2, as shown in (A) of FIG. 3. However, after the job is divided and transferred in the node 1, 3% of tasks have been completed in the node 1, and 1% of tasks have been completed in the node 2, as shown in (B) of FIG. 3. Data of the usage of computer resources, such as a CPU and a memory, in each of the nodes is stored in a resource usage ratio field. Data of a resource usage ratio can be obtained by using an OS command (for example, in the case of UNIX (R), vmstat) in each of the nodes. After the predetermined time has elapsed after starting execution of the job, 80% of resources are used in the node 1. However, after the tasks are divided and transferred in the node 1, 50% of resources are used in the node 1, and 60% of resources are used in the node 2. Data of a transfer destination node name in a case where tasks are transferred from each of the nodes to another node is stored in a transfer destination node list field. After the job is divided and transferred in the node 1, the tasks are divided and transferred from the node 1 to the node 2. These items of data are updated as necessary except the node name field.

Figure 4:
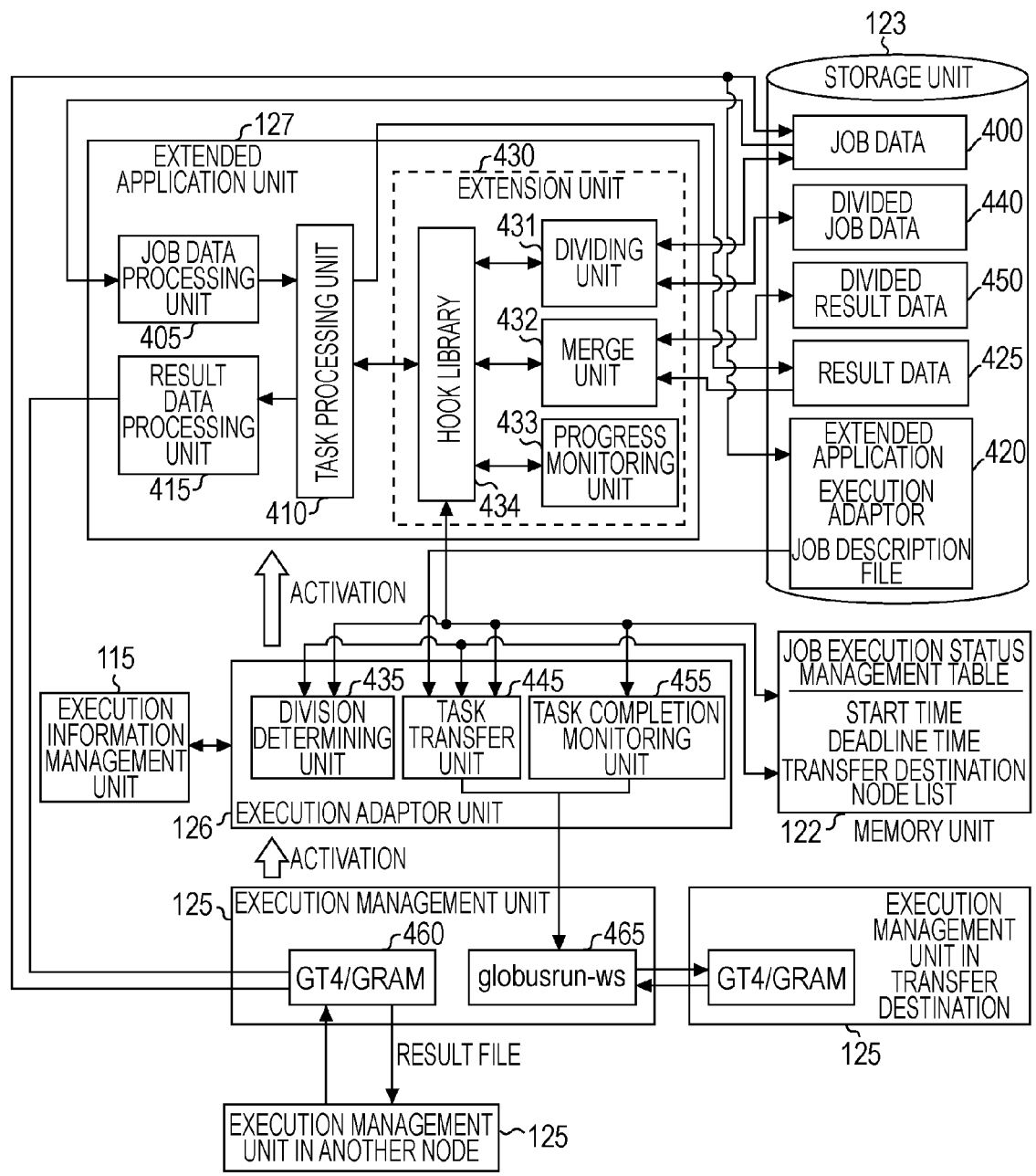
FIG. 4 is a functional block diagram showing the main functions of an execution adaptor unit and an extended application unit according to an embodiment.

FIG. 4 is a functional block diagram showing the main functions of the execution adaptor unit 126 and an extended application unit 127 according to an embodiment in each of the nodes 120, together with the execution management unit 125. In known application software, when the execution management unit 125 receives job data, the execution management unit 125 stores the job data in a job data file 400 in the storage unit 123 and activates an application unit. In the application unit, a task that is given as the job data is read from the job data file 400 in the storage unit 123 into a job data processing unit 405 and processed in a task processing unit 410. Then, result data is written to a result data processing unit 415 to be supplied to the execution management unit 125. In the present invention, the application unit 124 in each of the nodes 120 shown in FIG. 1 constitutes the extended application unit 127 generated with extended application software. In the extended application unit 127, when the execution management unit 125 receives a job set, execution adaptor software, extended application software, and a job description file are retained in a job software file 420 in the storage unit 123. Moreover, result data generated in the task processing unit 410 is retained in a result data file 425 in the storage unit 123. An extension unit 430 is provided in the extended application unit 127. The extension unit 430 includes a dividing unit 431, a merge unit 432, a progress monitoring unit 433, and a hook library 434 that intervenes between these components and the task processing unit 410. The application unit 124 is extended in this way so as to autonomously dividing and transferring tasks in each of the nodes 120. The execution management unit 125, to which the job set has been supplied from the execution information management unit 115, in each of the nodes 120 first activates the execution adaptor software to generate the execution adaptor unit 126, as described above. Subsequently, the execution adaptor unit 126 activates the extended application software to generate the extended application unit 127.

The hook library 434 in the extension unit 430 periodically communicates with a division determining unit 435 in the execution adaptor unit 126 to determine whether to divide tasks. At this time, the progress monitoring unit 433 in the extension unit 430 is called to calculate the progress rate of task processing and provide the progress rate to the execution adaptor unit 126. The execution adaptor unit 126 obtains the job completion ratio from the progress rate of task processing and provides the job completion ratio to the job execution status monitoring unit 205 in the execution information management unit 115. When the division determining unit 435 determines that division is necessary, the execution adaptor unit 126 sends an inquiry to the execution information management unit 115 in the center console 110 to acquire a transfer destination node, and stores data of the name of the transfer destination node in a transfer destination node list in the memory unit 122. Then, the execution adaptor unit 126 sends the hook library 434 notification of the file name of a divided job data file 440 for writing divided job data to the storage unit 123.

The hook library 434 calls the dividing unit 431 in the extension unit 430, tasks that have not been processed are read from the storage unit 123 and divided by the dividing unit 431, and some of the tasks to be transferred are written to and retained in the divided job data file 440 in the storage unit 123, the file name of the divided job data file 440 being specified. Moreover, the range of the tasks to be processed in the node is changed so as to cover remaining tasks. Then, notification that task transfer is ready to be started is sent to the execution adaptor unit 126. Specifically, in the extended application unit 127, a division ratio and an output file name are specified, job data that has not been processed is divided according to the specified division ratio, and a part of the job data that has not been processed to be transferred is written to the specified output file. The output file is supplied to the transfer destination node and is handled as an input file to be processed in the transfer destination node.

A job description file for defining a job is created by a task transfer unit 445 in the execution adaptor unit 126, and a request for new task transfer is sent to the execution management unit 125 by the task transfer unit 445, together with the extended application unit 127 and the execution adaptor unit 126 (a specified file name). At this time, the transfer destination node is the node, acquired by the division determining unit 435, in the transfer destination node list stored in the memory unit 122. When task processing is completed in the transfer destination node, divided result data is supplied from the transfer destination node and stored in a divided result data file 450 in the storage unit 123.

When task processing in the extended application unit 127 is completed, merge processing is performed by the hook library 434. The hook library 434 sends an inquiry to a task completion monitoring unit 455 in the execution adaptor 126 to wait until the transfer destination node, to which task processing has been delegated, completes the task processing to obtain divided result data and store the divided result data in the divided result data file 450 in the storage unit 123. Then, the hook library 434 calls the merge unit 432 in the extension unit 430, and the merge unit 432 reads the divided result data from the divided result data file 450 in the storage unit 123 and merges the divided result data with result data of the node stored in the result data file 425 in the storage unit 123. This operation is repeated as many times as the number of transfer destination nodes, to which task processing has been delegated. In the task processing unit 410, when the merge processing is completed, the merged result data is finally written to the result data processing unit 415 as result data to be supplied to the execution management unit 125.

The execution management unit 125 includes grid middleware and the like and activates the execution adaptor unit 126. The execution management unit 125 further receives a job set such as job data from the execution management unit 125 in another node and stores the job set in the storage unit 123. In the illustration in FIG. 4, the execution management unit 125 receives a job set such as job data from the execution management unit 125 in another node. However, it should be understood that, in the case of a node to which a job is first supplied, the execution management unit 125 receives a job set from the execution information management unit 115 in the center console 110 instead of the execution management unit 125 in another node. The execution management unit 125 further receives result data from the result data processing unit 415 in the extended application unit 127 and returns the result data to the execution management unit 125 in the other node, which supplied the job set. In this way, the execution management unit 125 controls a process from input of a job set to output of result data. For example, an existing tool Globus Toolkit 4 (GT4) or Globus Resource Allocation Manager (GRAM) (460 in FIG. 4) may be used for such a process in the execution management unit 125. Moreover, when tasks are divided and transferred in a node, the execution management unit 125 obtains execution adaptor software, application software, a job description file, job data to divided and transferred, and data of a transfer destination node name from the task transfer unit 445 in the execution adaptor unit 126, and supplies them to the execution management unit 125 in the transfer destination node. For example, existing globusrun-ws (465 in FIG. 4) may used for such a process in the execution management unit 125.

FIG. 5 briefly shows a method according to an embodiment of the present invention for extending an application. The basic operation of an application that is just an example to be extended is shown in (A) of FIG. 5. Processing of a job is started (step 500), job data is read as input data (step 505), it is determined whether all tasks have been processed (step 510), the processing of the job is completed (step 515) when all tasks have been processed, tasks are processed one by one (step 520) when all tasks have not been processed, and finally result data is output to the result data file 425 in the storage unit 123. It is assumed that the application to be extended performs these operations. Other than this application, for example, an application that recursively processes tasks may be extended.

The operation of the application extended according to the present invention is shown in (B) of FIG. 5. In the present invention, a function of autonomously dividing and transferring a job is implemented merely by inserting extensions (parts indicated by heavy lines) in the positions of steps 525 and 530 shown in a process flow in (B) of FIG. 5 without changing the original process flow of the application. The extended function is to test whether a job needs to be divided every time, for example, a task is processed at a predetermined frequency, to add a hook for job division for actually dividing the job when the job needs to be divided, and to add a hook for merge processing for, after all tasks are completed, collecting and merging the results of processing tasks transferred to other nodes when executing the job. In addition to adding the hook library 434 to the extension unit 430 for theses hooks, the dividing unit 431, the merge unit 432, and the progress monitoring unit 433 are added to the extension unit 430 as call-back type components independent of the process flow. These call-back type extensions (components) are synchronously called by the hook library 434. In this case, when tasks are divided and transferred, the results of processing tasks left after the tasks are divided are written to a temporary output file of the extended application unit 127. Finally, these results are merged with the results from the transfer destination node to generate a result of processing the original job.

Figure 6:
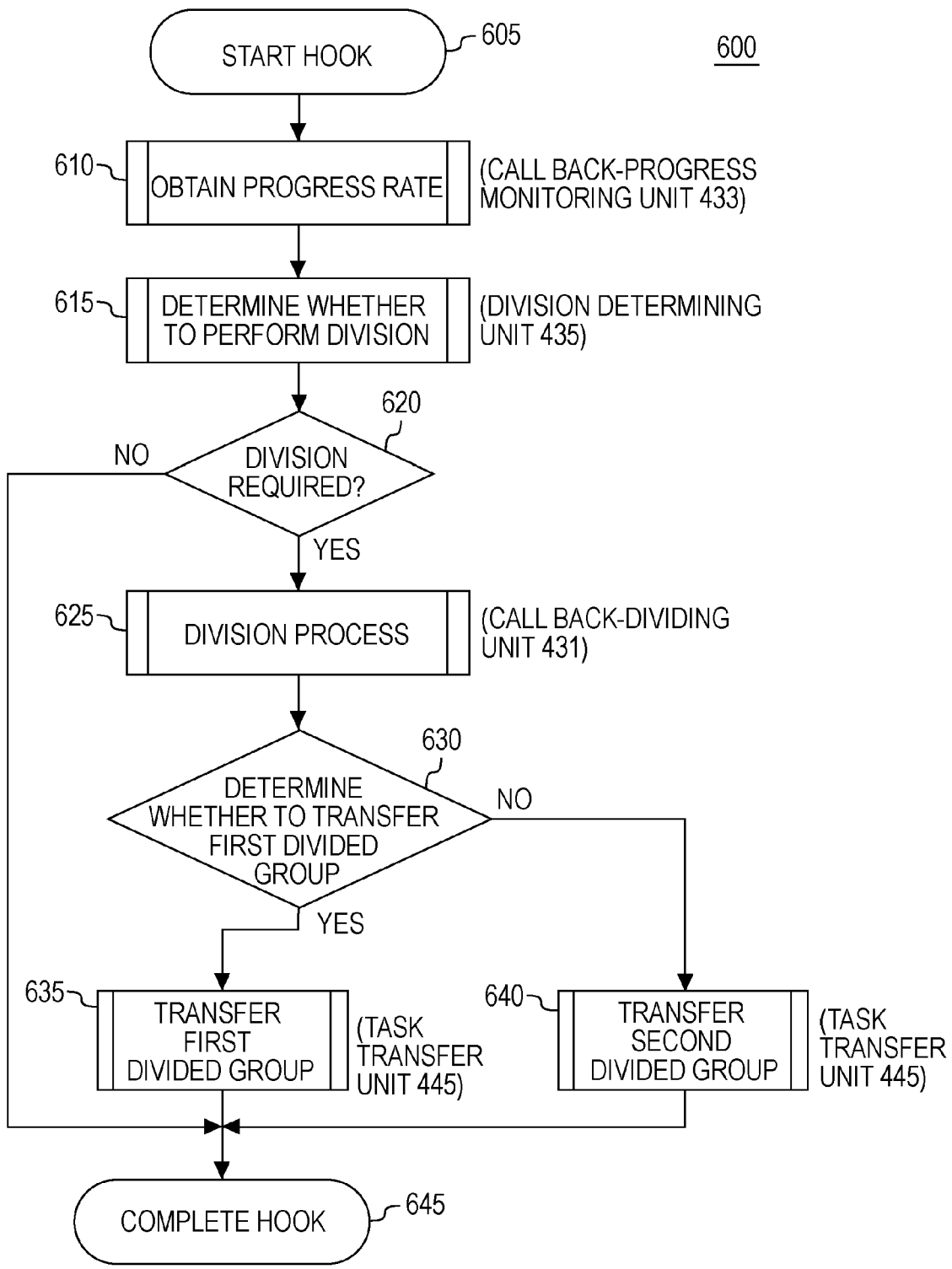
FIG. 6 is a flowchart briefly showing an operation in a hook for job division.

In FIG. 6, a flow briefly representing an operation in the hook for job division (step 525 in FIG. 5) is shown as 600. The hook is started by the hook library 434 (step 605), and the progress monitoring unit 433 in the extension unit 430 is first called to obtain the progress rate of task processing (step 610). Then, the obtained progress rate is supplied to the division determining unit 435 in the execution adaptor unit 126, and the division determining unit 435 is caused to determine whether to perform division (step 615). When the division determining unit 435 determines that task division is necessary, the name of a file, to which divided job data is written, and a division ratio are received from the division determining unit 435. When task division is not necessary (step 620), the hook process is completed (step 645). When task division is necessary (step 620), the dividing unit 431, which is a call-back type extension, is called, the division ratio and the file name are supplied to the dividing unit 431, and the dividing unit 431 is requested to perform division (step 625). It is determined whether to transfer a first group of tasks divided by the dividing unit 431, for example, the first half of the tasks (step 630). When the first group of the divided tasks are transferred, the task transfer unit 445 in the execution adaptor unit 126 is caused to transfer the first group of the divided tasks to a transfer destination node (step 635). A second group of the divided tasks that are not transferred, for example, the second half of the tasks, are additionally activated by the execution adaptor unit 126 for processing in the node. When the first group of the divided tasks are not transferred, the task transfer unit 445 in the execution adaptor unit 126 is caused to transfer the second group of the divided tasks to the transfer destination node (step 640). The first group of the divided tasks, which are not transferred, are additionally activated by the execution adaptor unit 126 for processing in the node. In both cases, the execution adaptor unit 126 is requested to transfer the first or second group of the divided tasks, and the hook process is completed (step 645).

Figure 7:
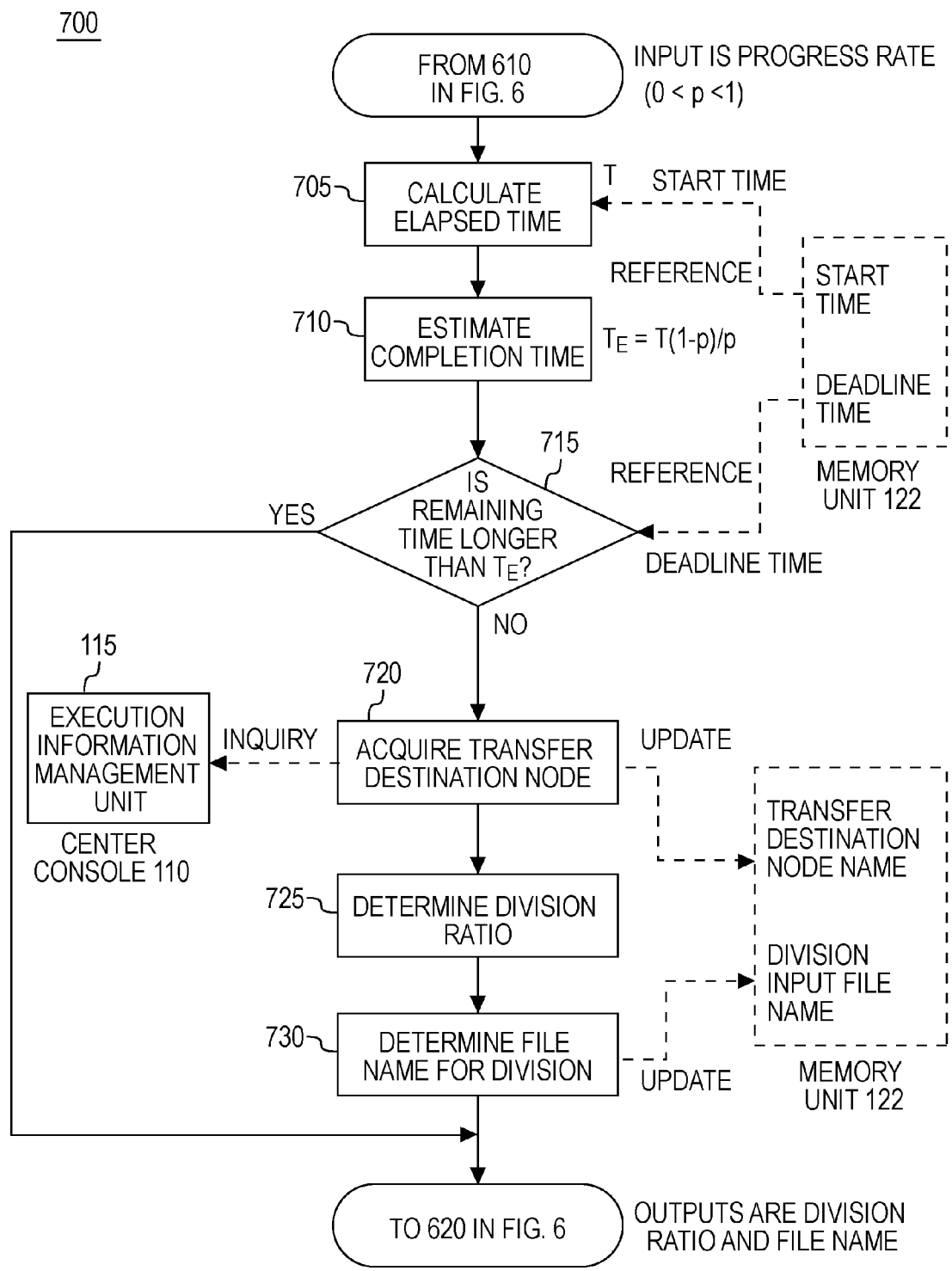
FIG. 7 is a flowchart briefly showing an operation in a division determining unit.

FIG. 7 shows an outline flow of a process in the division determining unit 435 in the execution adaptor unit 126 as 700. The division determining unit 435 determines on the basis of the progress rate of task processing from the progress monitoring unit 433 whether task division is necessary. When task division is necessary, a transfer destination node is acquired, and the name of a divided input file, to which divided job data is written, and a division ratio are determined. The progress rate p (0<p<1) of task processing obtained from the progress monitoring unit 433 and stored in the memory unit 122 is first supplied as input from step 610 in FIG. 6, and elapsed time T is calculated with reference to data of start time in the memory unit 122 (step 705). Then, completion time $T_E$ necessary to complete a job is estimated from the progress rate p and the elapsed time T according to equation $T_E=T(1-p)/p$ (step 710). Then, remaining time until deadline time is calculated with reference to data of the deadline time stored in the memory unit 122 and is compared with the completion time $T_E$ (step 715). When the remaining time is longer than the completion time $T_E$, it is determined that division is not necessary, so that the process of determining whether to perform division is completed, and the process proceeds to step 620 in FIG. 6. When the remaining time is not longer than the completion time $T_E$, an inquiry is sent to the execution information management unit 115 in the center console 110 to acquire a transfer destination node (step 720). At this time, data of the transfer destination node name acquired from the execution information management unit 115 is recorded and updated in the transfer destination node list in the memory unit 122. Other than the method in which an inquiry is sent to the execution information management unit 115 in the center console 110, a method exists, in which a transfer destination node is determined by sending inquiries to the execution management units 125 in surrounding nodes using broadcast in a peer-to-peer (P2P) mode. Moreover, a division ratio is determined (step 725). Determination of a division ratio is described below. The name of a file, to which some of divided tasks to be transferred are written, is determined, and data of a division input file name is recorded and updated in the memory unit 122 (step 730). Finally, pieces of data of the division ratio and the file name are read and output, and the process proceeds to step 620 in FIG. 6. When tasks need not be divided, nothing is output.

Figure 8:
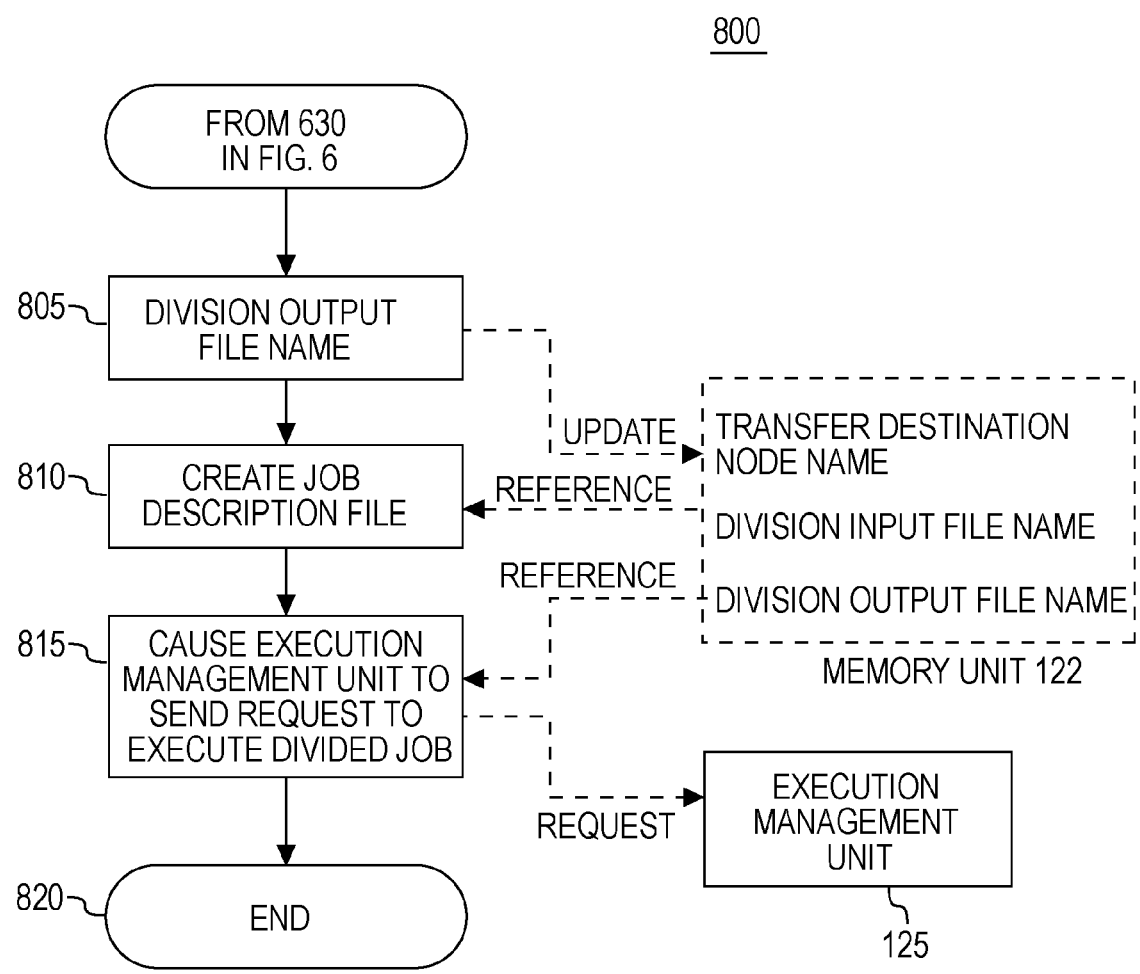
FIG. 8 is a flowchart briefly showing an operation in a task transfer unit.

FIG. 8 shows an outline flow of a process in the task transfer unit 445 in the execution adaptor unit 126 as 800. The task transfer unit 445 performs the process in the following steps upon receiving a request for task transfer from step 630 in FIG. 6. The name of a file, to which results of divided tasks are written, is first determined, and data of the division output file name is recorded and updated in the memory unit 122 (step 805). Then, a job description file for defining a job is created with reference to information of a transfer destination node name and the like in the memory unit 122 (step 810). Then, the job description file, execution adaptor software, and extended application software are supplied from the job software file 420 in the storage unit 123 to the execution management unit 125, and the execution management unit 125 is caused to send a request to execute a divided job (step 815).

Figure 9:
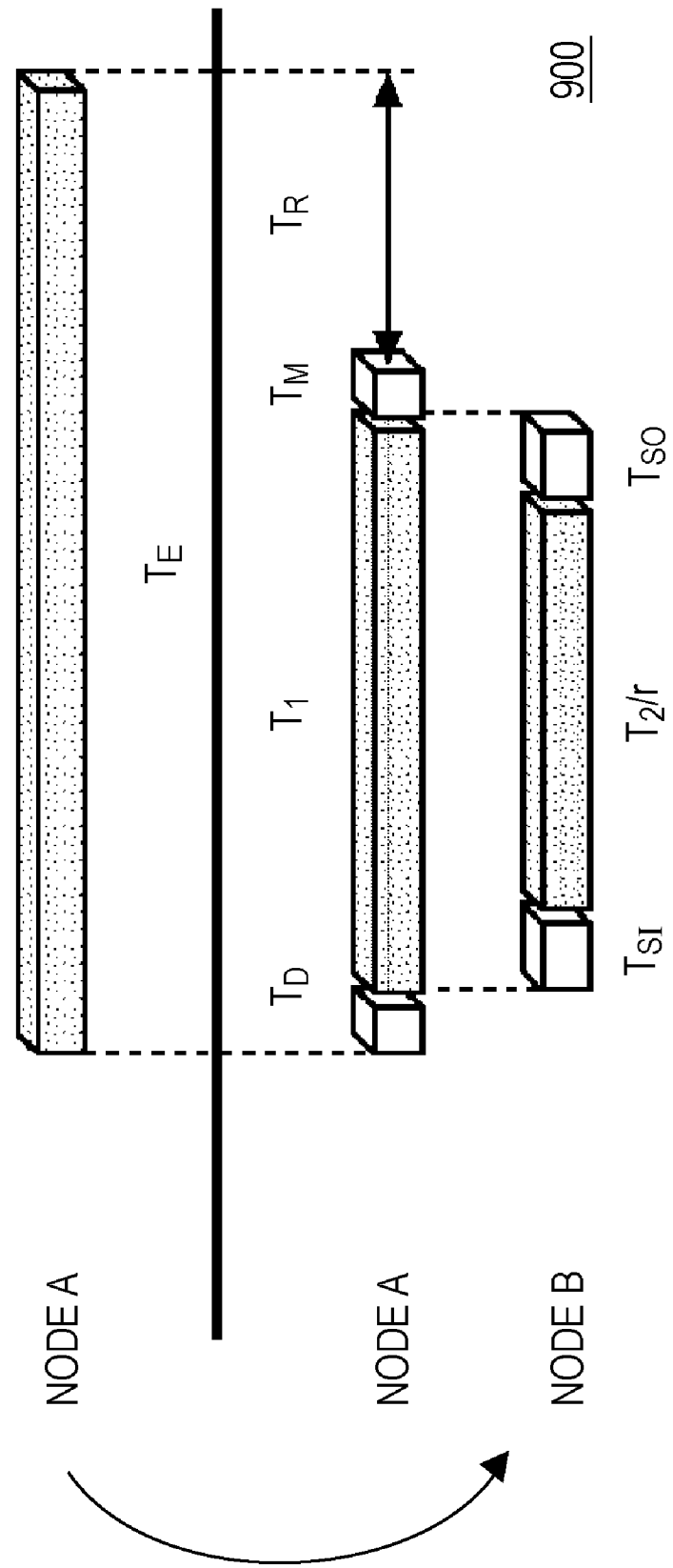
FIG. 9 briefly shows a method for determining a ratio for dividing tasks considering overhead.

A method 900 for determining a ratio for dividing tasks considering overhead will now be described with reference to FIG. 9. In a node A, when it is determined that tasks need to be divided, setup time $T_{SI}$ necessary for setup, such as copying of divided data, and acquisition time $T_{SO}$ necessary to receive a result of processing after the processing in a remote node B is completed are first estimated. Then, the setup time $T_{SI}$ and the acquisition time $T_{SO}$ are added to estimated completion time $T_E$, and the result is divided into two parts, so that time, out of the completion time $T_E$, necessary for a first group of divided tasks, such as the first half of the tasks, to be left in the node A is necessary time $T_1$, and remaining time, out of the completion time $T_E$, necessary for a second group of the divided tasks, such as the second half of the tasks, to be delegated to the node B is necessary time $T_2$. When the performances of the nodes A and B are different, assuming that the performance ratio is indicated by r (when the processing speed of the node B is slower than that of the node A, r<1), a weighted division ratio is calculated, as shown in FIG. 9.

$T_E = T_1 + T_2$ $T_1 = T_{SI} + T_{SO} + T_2/r$

From these equations, the following equations are obtained:

$T_1 = T_E/(1+r) + r(T_{SI}+T_{SO})/(1+r)$ $T_2 = rT_E/(1+r) - r(T_{SI}+T_{SO})/(1+r)$

It is recommended to determine a ratio for dividing tasks on the basis of the ratio between the necessary time $T_1$ and the necessary time $T_2$, i.e., to determine a ratio for dividing tasks such that the ratio of tasks to be left to tasks to be transferred is the ratio of $T_1$ to $T_2$. Execution time $T_R$ corresponding to time shortened by this division process is equal to the completion time $T_E$ minus the necessary time $T_1$ for the first group, overhead $T_D$ for a division process, and overhead $T_M$ for a merge process. When the length $T_R$ is equal to or less than zero, it can be determined that no advantageous effect can be obtained by the division, and the job execution time is extended by the division. Thus, a determination needs to be made, in which division process is performed only when $T_R$ is relatively large in relation to $T_E$. For example, a threshold value s that is determined mainly from the maximum number of computing nodes is set, and it is determined whether $T_R/T_E > s$.

$T_R = (T_E - T_{SI} - T_{SO})r/(1+r) - T_D - T_M > sT_E$

Figure 10:
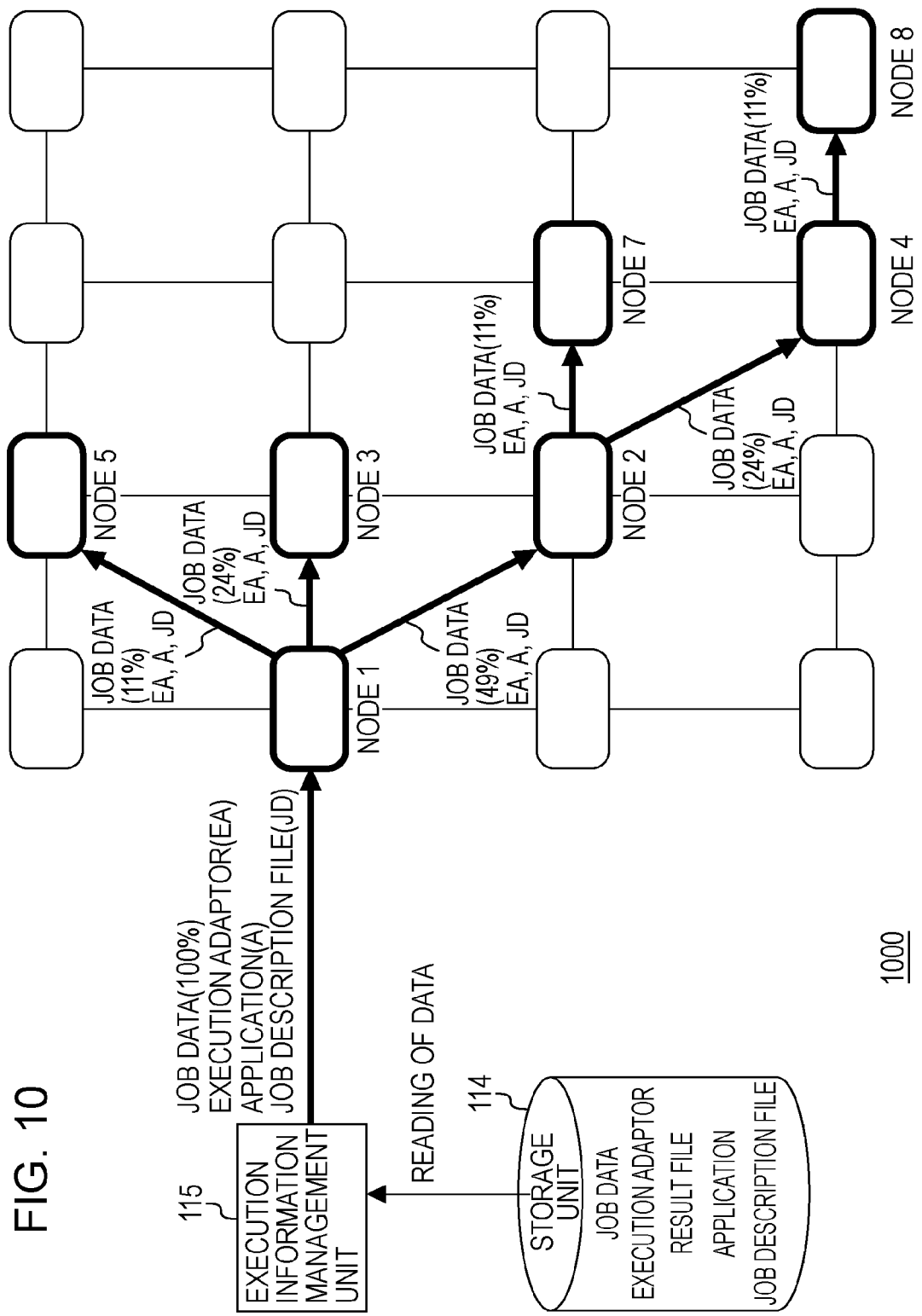
FIG. 10 is a schematic diagram simply showing the manner of division and transfer of tasks according to the present invention.

FIG. 10 shows an example 1000 in which job data is recursively divided and transferred among a plurality of nodes. The execution information management unit 115 in the center console 110 inputs job data (100%), execution adaptor software (EA), application software (A), and a job description file (JD) into an appropriate node (in this case, a node 1), as shown in FIG. 10. In the node 1, a job is executed in the steps described above. When tasks need to divided and transferred because a deadline is not expected to be met, tasks are transferred to a node 2. In FIG. 10, when 2% of the whole job has been processed, remaining 98% is divided into two parts, and 49% is transferred to the node 2. Then, when further 1% has been processed, tasks need to be transferred again, so that remaining 48% is divided into two parts, and this time, 24% of the tasks are transferred to a node 3. Then, when further 2% has been processed, tasks need to be transferred again, so that remaining 22% is divided into two parts, and this time, 11% of the tasks are transferred to a node 5.

Similar operations are also performed in other nodes. That is to say, in the node 2, 49% of the job data is supplied from the node 1. Then, 1% has been processed, task need to be transferred, so that remaining 48% is divided into two parts, and 24% of the tasks are transferred to a node 4. Then, when further 2% has been processed, tasks need to be transferred again, so that remaining 22% is divided into two parts, and this time, 11% of the tasks are transferred to a node 7. Moreover, in the node 4, 24% of the job data is supplied from the node 2. Then, when 2% has been processed, tasks need to be transferred, so that remaining 22% is divided into two parts, and 11% of the tasks are transferred to a node 8. In this example, a case is shown, in which division and transfer are performed in the following order: the node 1 to the node 2, the node 2 to the node 4, the node 1 to the node 3, the node 1 to the node 5, the node 2 to the node 7, and the node 4 to the node 8. In this way, in the present, the order in which division and transfer of tasks actually occur is not forecasted in advance, and such forecasting need not be performed.

Figure 11:
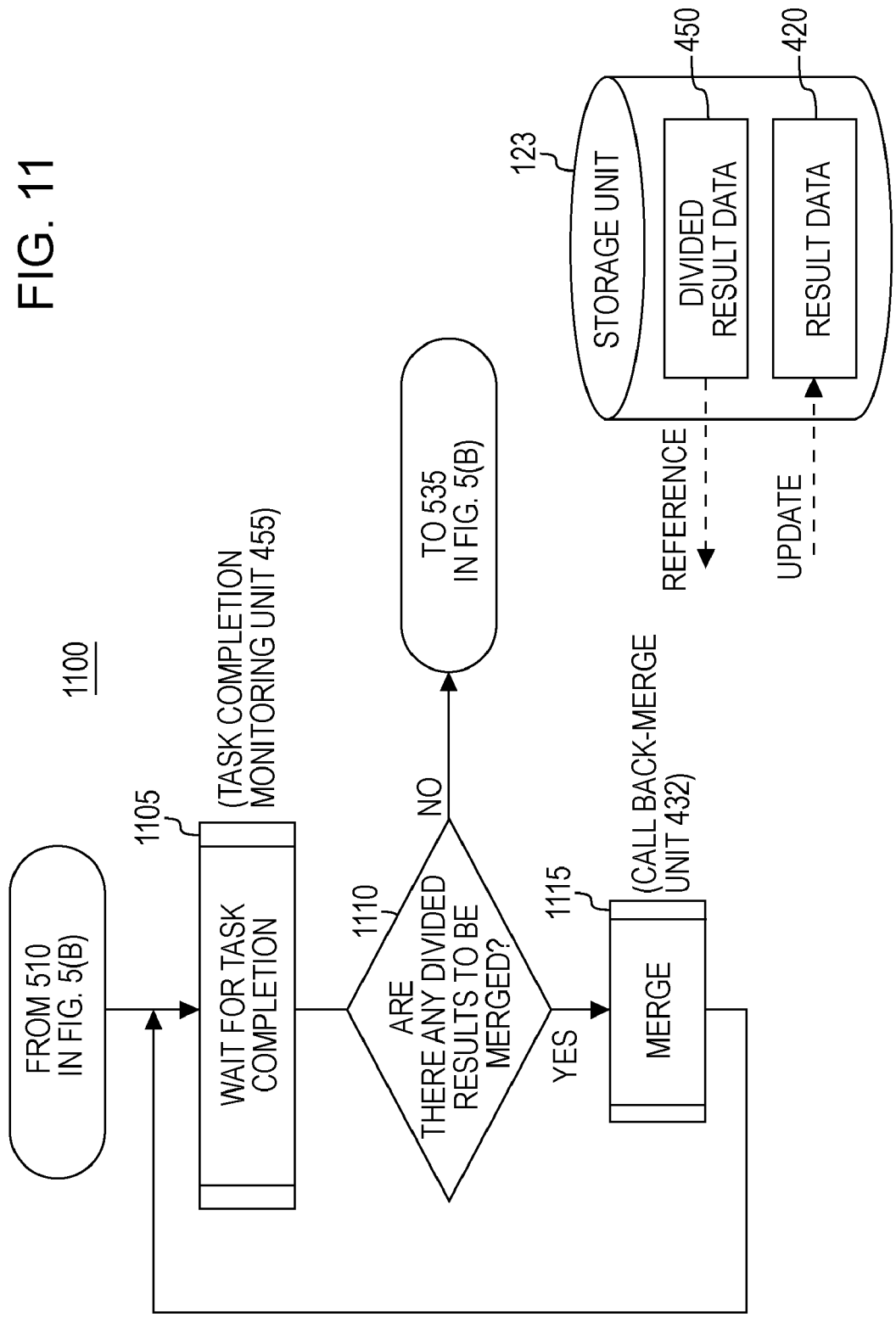
FIG. 11 is a flowchart briefly showing an operation in a hook for merge processing.

FIG. 11 shows a flow briefly representing an operation in the hook for merge processing (step 530 in FIG. 5) as 1100. The operation in the hook for merge processing is started from 510 in (B) of FIG. 5. Notification that task completion is waited for is first sent to the task completion monitoring unit 455 in the execution adaptor unit 126 to request the task completion monitoring unit 455 to monitor task completion (step 1105). Then, it is determined whether any divided results to be merged exist (step 1110). When divided results to be merged do not exist, the process proceeds to 535 in (B) of FIG. 5, and the hook processing is completed. When divided results to be merged exist, the name of a file, to which the divided result data has been output, is supplied to the merge unit 432 in the extension unit 430, and the merge unit 432 is called to perform merge processing to update result data (step 1115). After all results from transfer destination nodes, to which tasks are divided and transferred from the node, are read and merged in this way, the result is output from the execution management unit 125 as final result data in the node.

Figure 12:
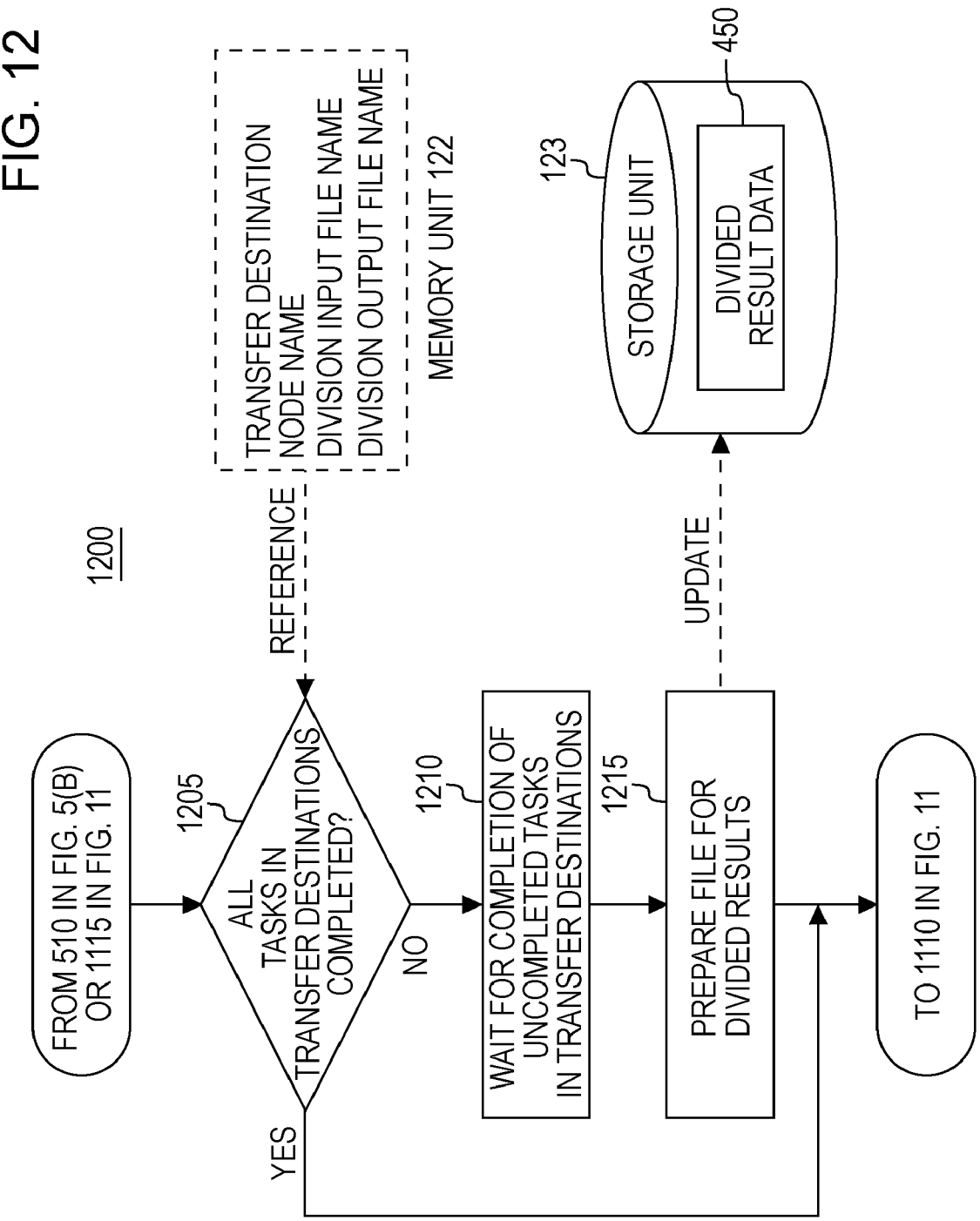
FIG. 12 is a flowchart briefly showing an operation in a task completion monitoring unit.

FIG. 12 shows a flow briefly representing an operation in waiting for task completion (step 1105 in FIG. 11) in the merge processing as 1200. The flow of the operation of waiting for task completion in transfer destination nodes in the task completion monitoring unit 455 in the execution adaptor unit 126 is as follows: The operation is started from 510 in (B) of FIG. 5 or 1115 in FIG. 11. It is determined with reference to the memory unit 122 whether all tasks in transfer destinations have been completed (step 1205). When all tasks in the transfer destinations have been completed, the process proceeds to 535 in (B) of FIG. 5 via 1110 in FIG. 11, and it is determined that merge processing is not necessary, so that the process is completed. When all tasks in the transfer destinations have not been completed, completion of uncompleted tasks in the transfer destinations is waited for with blocking being performed (step 1210). When the uncompleted tasks in the transfer destinations have been completed, a file for result data of divided tasks in the transfer destinations is prepared and written to the divided result data file 450 in the storage unit 123 (step 1215). Then, the process proceeds to 1110 in FIG. 11.

Figure 13:
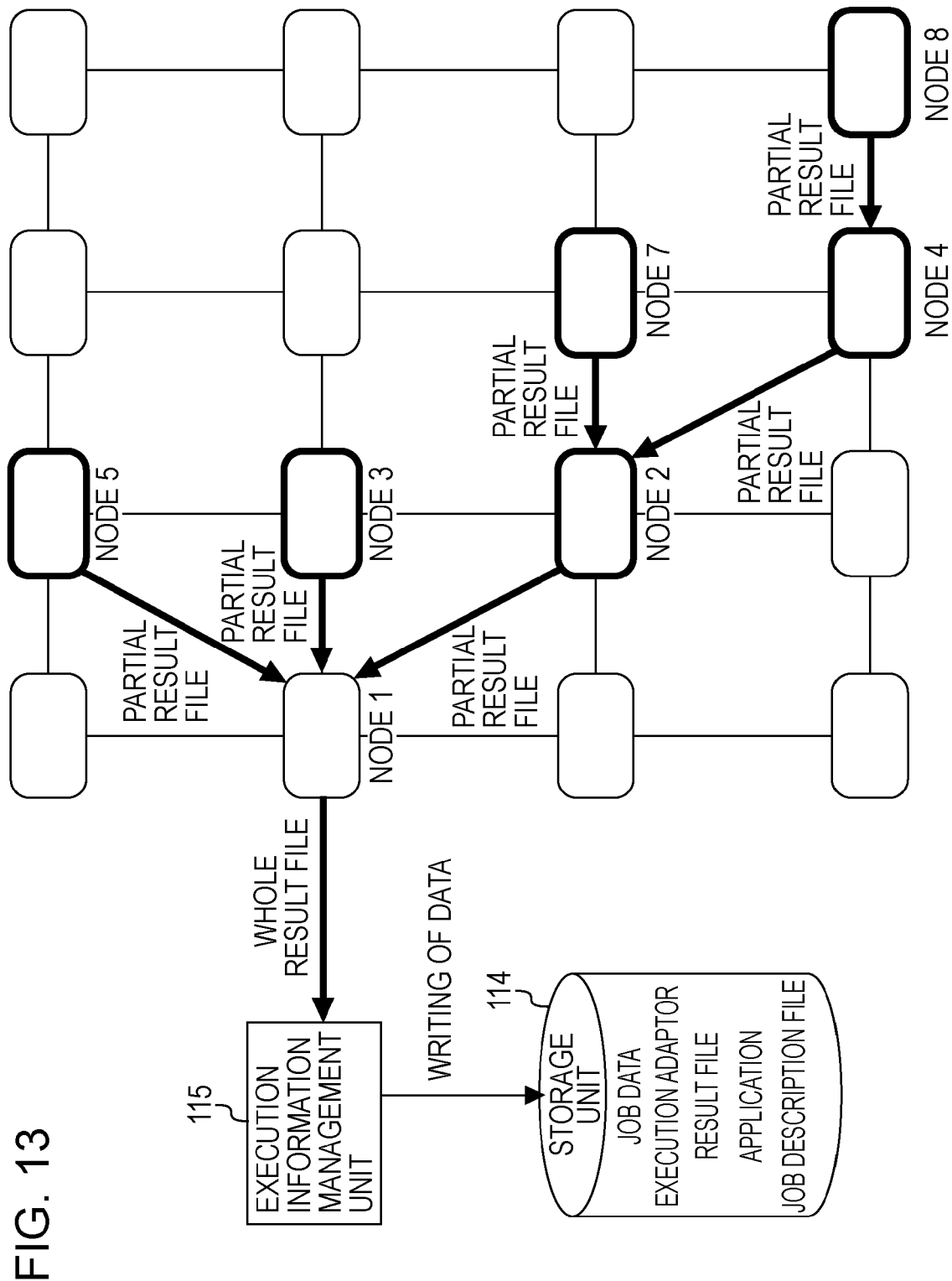
FIG. 13 shows an example in which results of processing are collected from individual nodes and merged.

FIG. 13 shows how, after tasks in individual nodes are completed, the results of processing in the individual nodes are collected and merged and the whole result is returned to the execution information management unit 115 in the center console 110. The merge processing is performed by tracing back the process of division and transfer. For example, since tasks are distributed in the following order in the process of division and transfer: the node 2 to the node 4, and then to the node 8, a process is performed, in which, after tasks are completed in the end node 8, a partial result file is returned to the node 4, and then, the result of merging the partial result file with a partial result in the node 4 is returned to the node 2. Partial result files are returned to the node 1 from not only the node 2 but also the nodes 3 and 5, to which division and transfer is performed in the node 1. In this way, results obtained in the individual nodes are merged and returned to the node 1, into which a job is first input, and a final result of the whole job is obtained in the node 1.

Figure 14:
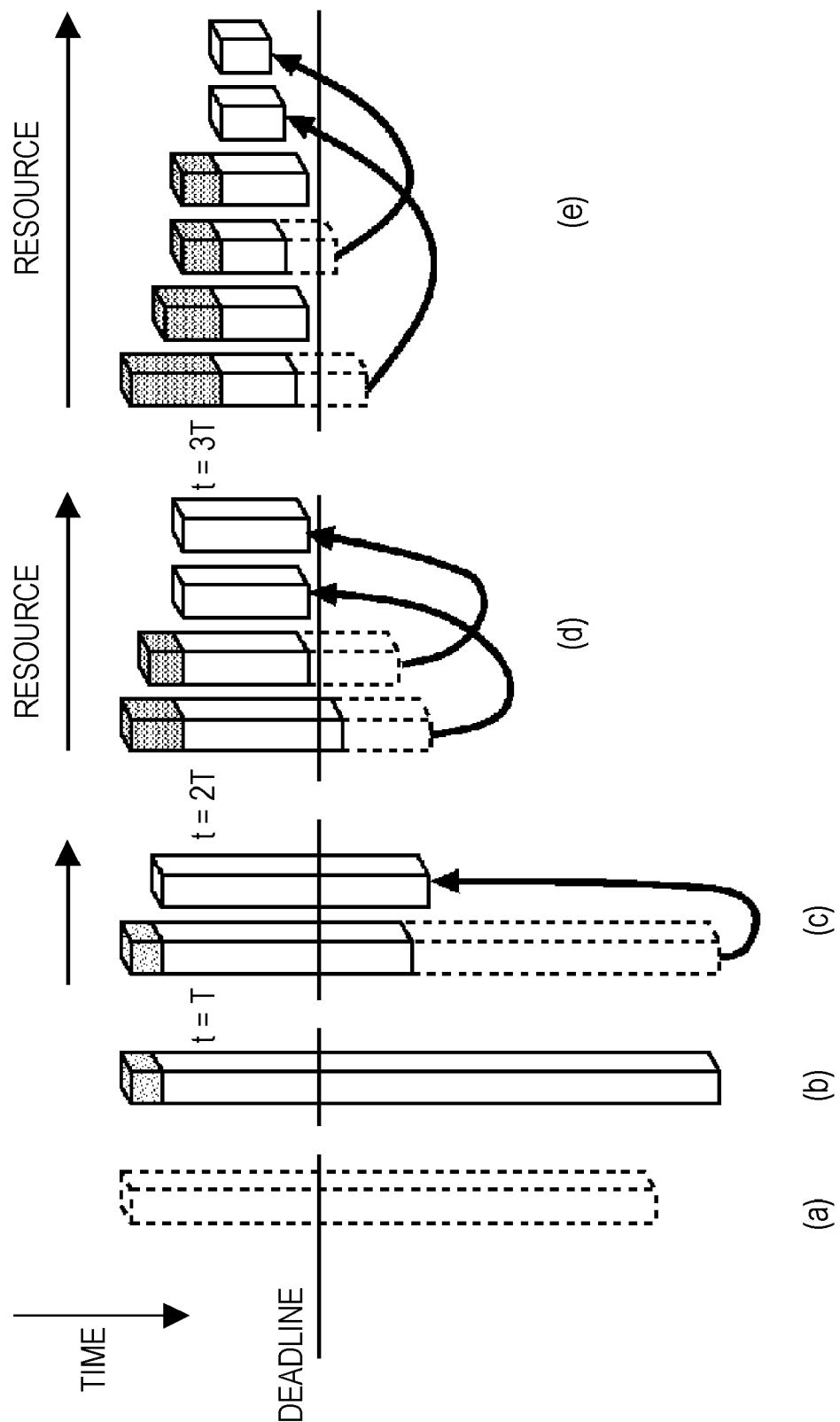
FIG. 14 shows an example in which job data is recursively divided and transferred among a plurality of nodes.

FIG. 14 is a schematic diagram simply showing the manner of division and transfer of tasks according to the present invention. In the present invention, in order to meet a target deadline in task processing, task division is repeated little by little in individual nodes to finally meet the deadline target using all the nodes of resources. It is first assumed that a job is processed, the total amount and the like of the job being initially unknown, as shown in (a). A deadline is given to the job. In (b), the job is input from, for example, a center console, and task processing is started in a node. When the task processing has been performed for short time (T) (a dark part of a prism), the completion time of the task processing is estimated. Thus, although the total amount and the like of the job are initially unknown, the completion time is estimated by a trial run of the job and estimation made on the basis of the trial run, so that the total amount of the job is approximately determined. Apparently, the estimated completion time (the bottom of a prism) is beyond the deadline. Thus, in (c), the task processing in the node is suspended, task are divided, and the second half of the tasks (the lower part of a prism) are transferred to another node. In (d), the task processing is resumed. In each of the nodes in which the task processing is performed, when the task processing has been performed for the short time (T) (a dark part of a prism), the completion time of the task processing is estimated again. The estimated completion time (the bottom of a prism) in each of the nodes varies with a change in the resource usage ratio, division and transfer of tasks, and the like. In the first node, the completion times estimated again in (d) and (e) are longer than the completion times at the time of division in (c) and (d), respectively. In (e), in each of the nodes, until all of the divided tasks are expected to be completed before the deadline, a test is performed to check whether estimated completion time (the bottom of a prism) is beyond the deadline, and suspension, division, transfer, and resuming of tasks are repeated.

Even when the usages of resources change moment to moment, the situation can be flexibly handled by periodically repeating such a test in each of the nodes even after it is determined that a deadline target can be achieved. The less the total number of tasks, the higher the accuracy of estimation of completion time. Thus, since completion time can be estimated in each of the nodes with the number of tasks being reduced by dividing the tasks, the accuracy of the result of checking whether a deadline target can be achieved can be ensured. FIG. 14 shows a process in which, while a job input into a node is executed, tasks are autonomously divided, so that the job is finally distributed to six nodes and executed. In this case, an example is shown, in which, in each of the nodes, tasks are continuously divided into two groups when the tasks are divided. Alternatively, tasks may be divided into more than two groups at an appropriate division ratio when the tasks are divided. Thus, it should be understood that task division in the present invention is not limited to a case where tasks are divided into two groups. Moreover, spare time until the deadline in each of the nodes is used to execute another job in a similar manner.

FIG. 15 is a graph showing the manner of operations of five different jobs in the present invention. A known method is shown in (A) of FIG. 15, in which the numbers of requested sources (processors) and estimated processing times are given to make a schedule, and then the plurality of jobs are performed after the resources are reserved. Information on the plurality of jobs is needed in advance to make a schedule in this way. In contrast, the method according to the present invention is shown in (B) of FIG. 15, in which, while tasks are autonomously divided during job execution, the resources are assigned, and the plurality of jobs are processed. The drawing shows that time during which resources do not operate between different jobs, as in (A) of FIG. 15, does not exist, and the capability utilization of resources increases, so that completion times of jobs are totally shortened.

While the present invention has been described via the embodiments, the technical scope of the present invention is not limited to the scope described in the foregoing embodiments. Various changes or improvements can be made in the foregoing embodiments. Needless to say, the embodiments that are changed or improved are included in the technical scope of the present invention.

APPENDIX

Reference Numerals

100: job execution system
110: center console
111: processing unit
114: storage unit
115: execution information management unit
120: node
121: processing unit
122: memory unit
123: storage unit
125: execution management unit
126: execution adaptor unit
127: extended application unit
430: extension unit
431: dividing unit
432: merge unit
433: progress monitoring unit
434: hook library
435: division determining unit
445: task transfer unit
455: task completion monitoring unit

What is claimed is:

1. A method for executing a job that is divided into a selected number of job tasks with a plurality of interconnected computers, the method comprising:
    providing the job to one computer of the plurality of computers and processing job tasks with the one computer for a predetermined time;
    with a processing unit on the one computer, calculating a progress rate of job task processing for the predetermined time and estimating a completion time for job task processing on the one computer on the basis of the progress rate and the predetermined time;
    determining with the processing unit whether the estimated completion time meets requirements of the job;
    when the estimated completion time meets the requirements, processing job tasks on the one computer with the one computer and generating results; and
    when the estimated completion time does not meet the requirements:
        with the processing unit, dividing job tasks on the one computer into job tasks to be left on the one computer and job tasks to be transferred to another computer of the plurality of computers,
        with the one computer, processing the job tasks to be left on the one computer for a further predetermined time and simultaneously, with the processing unit, transferring the job tasks to be transferred to the other computer and causing the other computer to process the transferred job tasks,
        until the estimated completion time meets the requirements, repeating a cycle in which a completion time for job task processing is estimated, and job tasks are divided, so that job tasks to be left on the one computer are processed for a further predetermined time and simultaneously job tasks to be transferred are transferred to the other computer and the other computer is caused to process the transferred job tasks, and
        with the processing unit, obtaining results of the transferred and processed job tasks from the other computer and merging the obtained results with results of the job tasks processed with the one computer.

2. The method according to claim 1, wherein calculating the progress rate includes, with the processing unit, monitoring and counting the number of processed job tasks and calculating a ratio of the number of the processed job tasks to the number of job tasks to be processed.

3. The method according to claim 1, wherein estimating the completion time for job task processing includes, with the processing unit, calculating the completion time according to the equation $TE=T(1-p)/p$, where TE is the completion time, T is the predetermined time, and p is the progress rate.

4. The method according to claim 1, wherein the requirements include a deadline time that is a desired execution completion time of the job, and wherein determining whether the estimated completion time meets the requirements of the job includes determining with the processing unit whether a remaining time until the deadline time is longer than the estimated completion time.

5. The method according to claim 1, wherein the requirements include an available time during which the computers can be used for the job, the available time being determined from a charge based upon a usage cost of the computers, and wherein determining whether the estimated completion time meets the requirements of the job includes determining with the processing unit whether the available time is longer than the estimated completion time.

6. The method according to claim 1, wherein dividing job tasks into the job tasks to be left and the job tasks to be transferred includes:
    estimating a setup time necessary to prepare the job tasks to be transferred and an acquisition time necessary to obtain results of the transferred and processed job tasks;
    dividing the estimated completion time on the basis of the estimated completion time, the estimated setup time, the estimated acquisition time, and a ratio of performance of the other computer to performance of the one computer; and
    setting a division ratio at which the estimated completion time is divided as a division ratio for the job tasks to be left and the job tasks to be transferred.

7. The method according to claim 1, further comprising:
    selecting from the plurality of computers a computer with a low resource usage ratio as the other computer;
    transferring the job tasks to be transferred to the computer with the low resource usage ratio; and
    causing the computer to process the transferred job tasks.

8. The method according to claim 1, wherein transferring the job tasks to be transferred to the other computer and causing the other computer to process the transferred job tasks include processing job tasks transferred to the other computer in the same manner that job tasks are processed on the one computer, and obtaining results of the transferred and processed job tasks from the other computer includes returning, from the other computer to the one computer, results obtained by processing job tasks on the other computer in the same manner and merging results of the job tasks.

9. The method according to claim 1, wherein providing the job to the one computer includes providing the job to the one computer from a center console connected to the plurality of computers, transferring the job tasks to be transferred to the other computer and causing the other computer to process the transferred job tasks include transferring the job tasks to be transferred to the other computer that is selected by the center console and causing the other computer to process the transferred job tasks, and the center console receives a result of merging on the one computer as a result of the job.

10. The method according to claim 1, wherein the computers are interconnected via one or more networks.

11. A system for executing a job that is divided into a selected number of job tasks, the system comprising:
a plurality of interconnected computers; and
a center console connected to the plurality of computers, wherein each of the computers includes:
an extended application unit that is executed by a processing unit on the computer, the extended application unit including an extension unit that divides job tasks and merges results of the job tasks,
an execution adaptor unit that is executed by the processing unit, the execution adaptor unit activating the extended application unit and causing the extended application unit to divide job tasks and merge results of the job tasks, and
an execution management unit that is executed by the processing unit, the execution management unit activating the execution adaptor unit and managing the extended application unit and the execution adaptor unit, and
the center console includes:
an execution information management unit that is executed by a processing unit of the center console, the execution information management unit obtaining data on execution status of the job on each of the computers from the execution adaptor unit, and when job tasks are divided on each of the computers, selecting another computer out of the plurality of computers as a transfer destination to which the divided job tasks are transferred and indicating the other computer to the execution adaptor unit; and
wherein the center console accepts application software and data on the job from a user, generates extended application software and execution adaptor software from the application software, provides the data on the job, the extended application software, and the execution adaptor software to each of the computers, causes each of the computers to execute the job, receives a result of executing the job from each of the computers, and then provides the result to the user.

12. The job execution system according to claim 11, wherein the extension unit includes:
a progress monitoring unit that monitors the number of job tasks that have been processed by each of the computers and generates data on a progress rate of job task processing;
a dividing unit that reads job tasks that have not been processed on each of the computers from a storage unit on each of the computers, divides the read job tasks, generates data on job tasks to be transferred, and stores the generated data in the storage unit;
a merge unit that merges data on results of processing job tasks left by job task division with data on results of processing the job tasks transferred by the job task division at a transfer destination; and
a hook library for the execution adaptor unit to call the progress monitoring unit, the dividing unit, and the merge unit.

13. The job execution system according to claim 12, wherein the execution adaptor unit includes:
a division determining unit that obtains the data on the progress rate of the job task processing from the progress monitoring unit to estimate a completion time of the job task processing, obtains data on requirements of the job from a memory unit on each of the computers, and determines whether the estimated completion time meets the requirements;
a job task transfer unit that prepares data on the job tasks to be transferred by the job task division from the storage unit, obtains data on a transfer destination from the memory unit, and provides the data on the job tasks and the data on the transfer destination to the execution management unit to transfer the tasks; and
a job task completion monitoring unit that monitors whether processing of the transferred job tasks has been completed at the transfer destination.

14. The job execution system according to claim 11, wherein the execution management unit generates the extended application unit and the execution adaptor unit when extended application software and execution adaptor software are provided to the execution management unit, and provides job tasks to be transferred by the job task division to the other computer, which is a transfer destination.

15. The job execution system according to claim 11, wherein the execution information management unit includes:
a job execution status monitoring unit that obtains data on a job completion ratio and a resource usage ratio on each of the computers from the execution adaptor unit; and
a job execution status display unit that obtains the data on the job completion ratio and the resource usage ratio from the job execution status monitoring unit and generates data on progress of the whole job.

16. The job execution system according to claim 15, wherein the execution information management unit further includes:
a transfer destination selecting unit that obtains data on the job completion ratios and the resource usage ratios on the plurality of computers, selects the other computer as a transfer destination on the basis of the data on the job completion ratios and the resource usage ratios, and indicates the selected other computer to the execution adaptor unit.

17. The job execution system according to claim 11, wherein the computers are connected to one another and to the center console via one or more networks.

18. A computer program product stored in a memory and executed by a processor for executing a job that is divided into a selected number of job tasks with a plurality of interconnected computers, the program product causing one computer of the plurality of computers to perform:
receiving the job;
processing job tasks for a predetermined time;
with a processing unit on the one computer, calculating a progress rate of job task processing for the predetermined time and estimating a completion time for job task processing on the one computer on the basis of the progress rate and the predetermined time;

determining with the processing unit whether the estimated completion time meets requirements of the job;

when the estimated completion time meets the requirements, processing job tasks on the one computer with the one computer and generating results; and when the estimated completion time does not meet the requirements:

with the processing unit, dividing job tasks on the one computer into job tasks to be left on the one computer and job tasks to be transferred to another computer of the plurality of computers, with the one computer, processing the job tasks to be left on the one computer for a further predetermined time and simultaneously, with the processing unit, transferring the job tasks to be transferred to the other computer and causing the other computer to process the transferred job tasks, until the estimated completion time meets the requirements, repeating a cycle in which a completion time for job task processing is estimated, and job tasks are divided, so that job tasks to be left on the one computer are processed for a further predetermined time and simultaneously job tasks to be transferred are transferred to the other computer and the other computer is caused to process the transferred job tasks, and with the processing unit, obtaining results of the transferred and processed job tasks from the other computer and merging the obtained results with results of the job tasks processed with the one computer.

19. The program product according to claim 18, wherein the computers are interconnected via one or more networks.

* * * * *